(12) United States Patent
Choi et al.

(10) Patent No.: US 10,303,122 B2
(45) Date of Patent: May 28, 2019

(54) STRAP AND ELECTRONIC DEVICE INCLUDING THE SAME

(71) Applicant: SAMSUNG ELECTRONICS CO., LTD., Suwon-si, Gyeonggi-do (KR)

(72) Inventors: Bong Suk Choi, Seoul (KR); Byoung Uk Yoon, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 172 days.

(21) Appl. No.: 15/607,783

(22) Filed: May 30, 2017

(65) Prior Publication Data

US 2017/0357214 A1 Dec. 14, 2017

(30) Foreign Application Priority Data

Jun. 14, 2016 (KR) .................. 10-2016-0073773

(51) Int. Cl.
| | |
|---|---|
| *G06F 1/16* | (2006.01) |
| *G04G 17/04* | (2006.01) |
| *G04B 37/14* | (2006.01) |
| *A44C 5/00* | (2006.01) |
| *H02J 7/00* | (2006.01) |
| *G04G 17/08* | (2006.01) |
| *H01M 2/02* | (2006.01) |

(Continued)

(52) U.S. Cl.
CPC ............ *G04B 37/14* (2013.01); *A44C 5/0053* (2013.01); *G04C 10/00* (2013.01); *G04G 17/04* (2013.01); *G04G 17/083* (2013.01); *G06F 1/163* (2013.01); *H01M 2/0207* (2013.01); *H01M 10/0585* (2013.01); *H02J 7/0044* (2013.01)

(58) Field of Classification Search
CPC ................................ G06F 1/163; G04G 17/04
USPC .................................................... 361/679.03
See application file for complete search history.

(56) References Cited

U.S. PATENT DOCUMENTS

| | | | | |
|---|---|---|---|---|
| 4,427,303 A | * | 1/1984 | Matthias ............ | G04B 37/1486 368/282 |
| 5,008,864 A | * | 4/1991 | Yoshitake ............ | G04B 47/025 368/10 |

(Continued)

FOREIGN PATENT DOCUMENTS

| | | |
|---|---|---|
| JP | 2000-173559 | 6/2000 |
| JP | 2002-151032 | 5/2002 |

(Continued)

OTHER PUBLICATIONS

Search Report and Written Opinion dated Aug. 16, 2017 in counterpart International Patent Application No. PCT/KR2017/005502.

(Continued)

*Primary Examiner* — Adrian S Wilson
(74) *Attorney, Agent, or Firm* — Nixon & Vanderhye, P.C.

(57) ABSTRACT

An electronic device includes a strap and a body. The strap includes a battery having a specific width, a specific thickness, and a specific length, a battery bracket having a size approximate to or greater than the size of the battery, seating the battery, and having at least one furrow formed around a part curved with a specific curvature, and a strap cover surrounding the battery bracket on which the battery is seated. The body has a side portion coupled to the at least one strap.

20 Claims, 24 Drawing Sheets

(51) Int. Cl.
*H01M 10/0585* (2010.01)
*G04C 10/00* (2006.01)

(56) References Cited

U.S. PATENT DOCUMENTS

| | | | | |
|---|---|---|---|---|
| 5,889,737 | A * | 3/1999 | Alameh | G04C 10/00 368/204 |
| 6,549,791 | B1 * | 4/2003 | Jeon | H04B 1/385 379/433.08 |
| 6,619,836 | B1 * | 9/2003 | Silvant | G04G 17/08 368/281 |
| 6,854,978 | B2 * | 2/2005 | Noirjean | H01Q 1/273 343/718 |
| 6,978,160 | B2 * | 12/2005 | Hutchison | H04B 1/385 455/573 |
| 7,280,844 | B2 | 10/2007 | Ikeda et al. | |
| 8,787,006 | B2 * | 7/2014 | Golko | G06F 1/163 361/679.03 |
| 8,908,479 | B2 * | 12/2014 | Teng | G04G 19/00 368/204 |
| 9,618,907 | B2 | 4/2017 | Su et al. | |
| 2003/0035266 | A1 * | 2/2003 | Ng | G06F 1/163 361/679.03 |
| 2005/0020302 | A1 | 1/2005 | Ikeda et al. | |
| 2007/0064542 | A1 * | 3/2007 | Fukushima | G04B 37/1486 368/282 |
| 2007/0279852 | A1 * | 12/2007 | Daniel | A44C 5/0007 361/679.03 |
| 2008/0159085 | A1 * | 7/2008 | Hozumi | A44C 5/14 368/282 |
| 2014/0218852 | A1 * | 8/2014 | Alcazar | G06F 1/163 361/679.03 |
| 2015/0333302 | A1 | 11/2015 | Johns et al. | |
| 2015/0378391 | A1 * | 12/2015 | Huitema | G06F 1/163 361/679.03 |
| 2016/0018790 | A1 | 1/2016 | Su et al. | |
| 2016/0063232 | A1 * | 3/2016 | Seol | G06F 3/03547 726/19 |
| 2016/0141746 | A1 | 5/2016 | Kim et al. | |

FOREIGN PATENT DOCUMENTS

KR  10-2016-0058608  5/2016
KR  10-2016-0058628  5/2016

OTHER PUBLICATIONS

Extended Search Report dated Sep. 26, 2017 in counterpart European Patent Application No. EP17175417.9.

* cited by examiner

<635> <637>

STRAP AND ELECTRONIC DEVICE INCLUDING THE SAME

CROSS-REFERENCE TO RELATED APPLICATION

This application is based on and claims priority under 35 U.S.C. § 119 to a Korean patent application filed on Jun. 14, 2016 in the Korean Intellectual Property Office and assigned Serial number 10-2016-0073773, the disclosure of which is incorporated by reference herein in its entirety.

TECHNICAL FIELD

The present disclosure relates generally to straps capable of supplying power, for example, in a wearable electronic device.

BACKGROUND

Conventional portable electronic devices have employed power supplies in the form of batteries. Among the portable electronic devices, a wearable electronic device may include a battery disposed in a body thereof.

Since the size of the body and the size of the battery mounted inside the body are significantly small due to the characteristic of the wearable electronic device, it is difficult to supply power sufficient to drive the electronic device.

SUMMARY

Example aspects of the present disclosure address at least the above-mentioned problems and/or disadvantages and to provide at least the advantages described below. Accordingly, various example embodiments of the present disclosure provide a strap and an electronic device including the same, capable of more stably supplying power to the electronic device by embedding a battery in the strap disposed at at least one side of the electronic device.

Various example embodiments provide a strap and an electronic device including the same, capable of improving the wearability of the electronic device by maintaining the strap in a curved shape.

Various example embodiments provide a strap and an electronic device including the same, capable of minimizing and/or reducing the failure of the strap by facilitating the manufacturing of a strap body.

Various example embodiments provide a strap and an electronic device including the same, capable of preventing and/or reducing the likelihood of a battery being damaged and handling liquid leakage that may occur when the battery is damaged.

In accordance with an example aspect of the present disclosure, an electronic device is provided. The electronic device may include a body housing including a first surface facing a first direction, a second surface facing a direction opposite the first direction of the first surface, and a side surface surrounding a space formed between the first surface and the second surface; a display included inside the body housing and exposed through the first surface; a processor included inside the body housing and electrically connected with the display; a wireless communication circuit included inside the body housing; a power management circuit included inside the body housing and electrically connected with the display, the processor, and the wireless communication circuit; and a wearing member (e.g., a strap) coupled to a portion of the body housing, extending in a first direction and configured to be detachably mounted on a portion of a human body of a user, and being bendable in the first direction, wherein the wearing member includes: an electronic component extending in the first direction and including an external surface that includes a repeating pattern including recesses and/or protrusions formed in at least one direction that is different from the first direction; and a polymer surrounding the external surface of the electronic component and forming an external surface of the wearing member.

In accordance with another aspect of the present disclosure, a strap for a wearable electronic device is provided. The strap may include a battery including a case, wherein a plurality of zig-zag patterns are formed on at least a portion of a surface of the case, the zig-zag patterns including hills and valleys, and are disposed in a specific direction; a battery bracket formed in a size approximate to or greater than a size of the battery, wherein the battery is seated on the battery bracket such that the zig-zag patterns of the battery are disposed on an outer portion of the battery; and a strap cover surrounding the battery bracket on which the battery is seated, wherein the battery bracket includes at least one furrow.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1A:
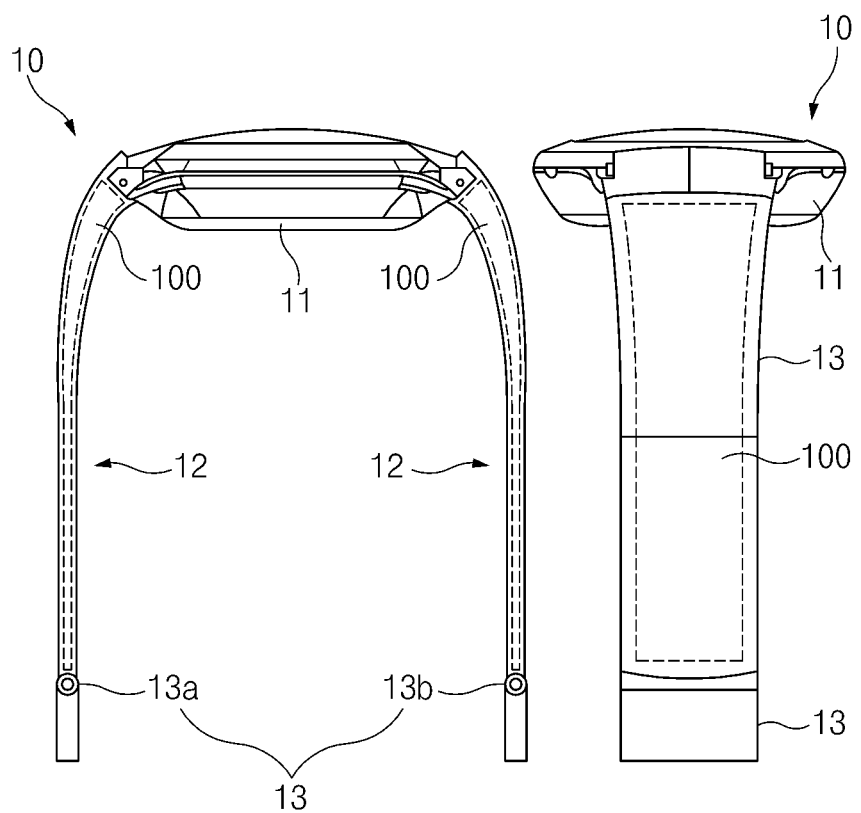
FIG. 1A is a diagram illustrating an example of an electronic device, according to an example embodiment of the present disclosure.

Various example embodiments of the present disclosure may be described with reference to accompanying drawings. Accordingly, those of ordinary skill in the art will recognize that modification, equivalent, and/or alternative on the various example embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or, or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not refer only to "specifically designed to" in hardware. Instead, the expression "a device configured to" may refer to a situation in which the device is "capable of" operating together with another device or other components. CPU, for example, a "processor configured to perform A, B, and C" may refer, for example, to a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe various specific example embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the disclosure, they may not be interpreted to exclude embodiments of the present disclosure.

An electronic device according to various example embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like, but is not limited thereto.

According to another example embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, or the like, but are not limited thereto.

According to another example embodiment, the electronic device may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like), or the like but is not limited thereto.

According to another example embodiment, the electronic devices may include at least one of parts of furniture or buildings/structures, electronic boards, electronic signature receiving devices, projectors, or various measuring instruments (e.g., water meters, electricity meters, gas meters, or wave meters, and the like), or the like, but are not limited thereto. In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various example embodiments may be described with reference to the accompanying drawings. The term "user" used herein may refer to a person who uses an electronic device or may refer to a device (e.g., an artificial intelligence electronic device) that uses an electronic device.

Figure 1B:
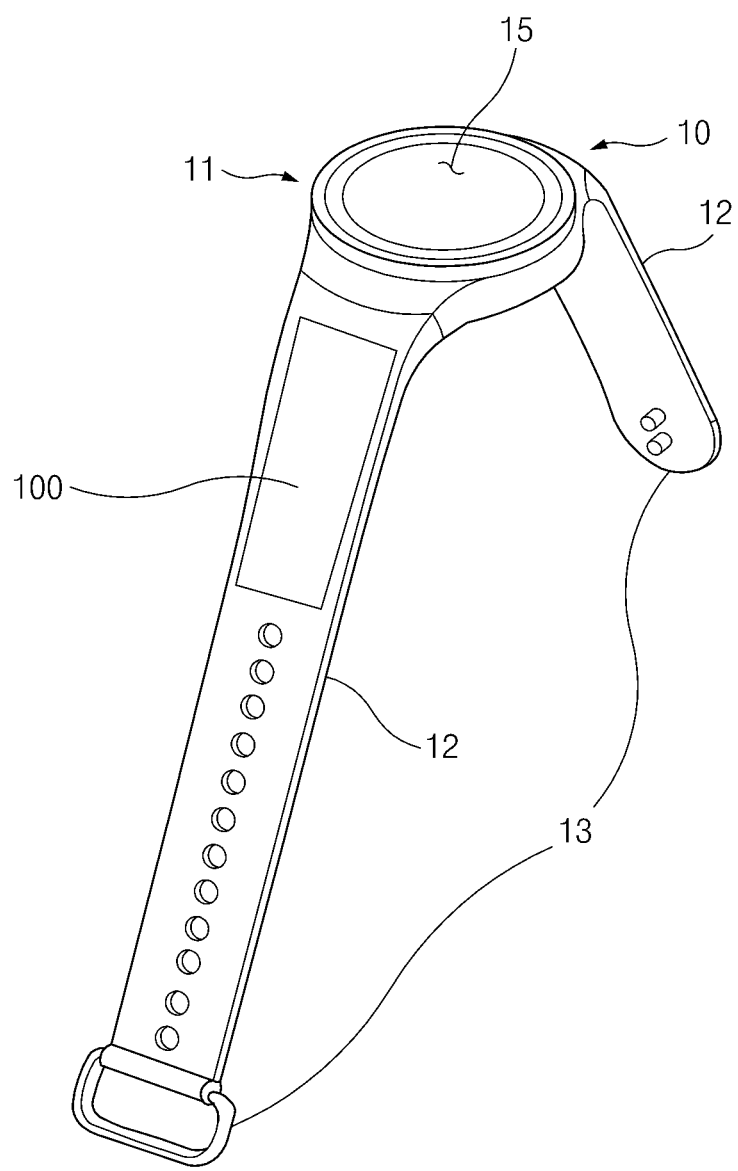
FIG. 1B is a diagram illustrating another example of an electronic device, according to an example embodiment of the present disclosure.

FIG. 1A is a diagram illustrating an example of an electronic device, according to an example embodiment of the present disclosure, and FIG. 1B is a diagram illustrating another example of the electronic device, according to an example embodiment of the present disclosure.

Referring to FIGS. 1A and 1B, according to the present disclosure, an electronic device 10 may include a strap 12 (or band) and a body 11. Additionally, the electronic device 10 may further include a display 15 seated on the body 11, a processor (e.g., including processing circuitry) (not shown) which controls the driving of the display 15, a memory which stores data (not shown), a printed circuit board on which the processor and the memory are mounted (not shown), and a main power supply (not shown) which supplies power necessary for the driving of the display 15. In addition, the electronic device 10 may further include a communication antenna (not shown) and a communication processor (not shown) in the case that the electronic device 10 has a communication function. The strap 12 may include a battery assembly 100 which supplies power to the body 11. The processor may process the driving of the display 15 using the power of the battery assembly 100 or the charging of power into the main power supply. In addition, the processor may process the driving of the electronic device 10 using the main power supply unit and the battery assembly 100. According to various example embodiments, the processor may compare the main power supply unit with the battery assembly 100 in power intensity. If the power of the battery assembly 100 is lower than that of the main power supply unit, the processor may insulate (electrically disconnect) the battery assembly 100 from the main power supply unit. To this end, the electronic device 10 may further include a switch used for the control of the electrical connection of the battery assembly 100.

As illustrated in drawings, in the strap 12, a portion, which is engaged with the body 11, may be thicker or wider than another portion. The strap 12 may be engaged with the body 11 while the strap 12 is being disposed in at least one direction (e.g., a direction inclined with a specific gradient downward from a top surface of the body 11 or a lateral direction of the body 11). The strap 12 may be disposed in one direction of a bracket having specific internal stiffness and including at least a portion which is curved. The strap 12 may be bent in a direction different from an initial disposition direction thereof and at a position different from an initial disposition position thereof by external force. To this end, at least a portion of the strap 12 may be formed of a flexible material. In drawings, the electronic device 10 may be illustrated, without limitation, as a watch-type wearable device. Accordingly, the strap 12 may be provided in such a manner that the electronic device 10 is wearable on the wrist of a user. An engagement unit 13 for the wearing on the wrist of the user may be disposed at a lower end portion (an opposite end of the engagement portion engaged with the body 11) of the strap 12. The engagement unit 13 may include various structural elements, such as, for example, and without limitation, a first coupling part 13a and a second coupling part 13b which couple paired straps 12 to each other. According to an example embodiment, the engagement unit 13 may include a buckle-type structure.

Figure 2A:
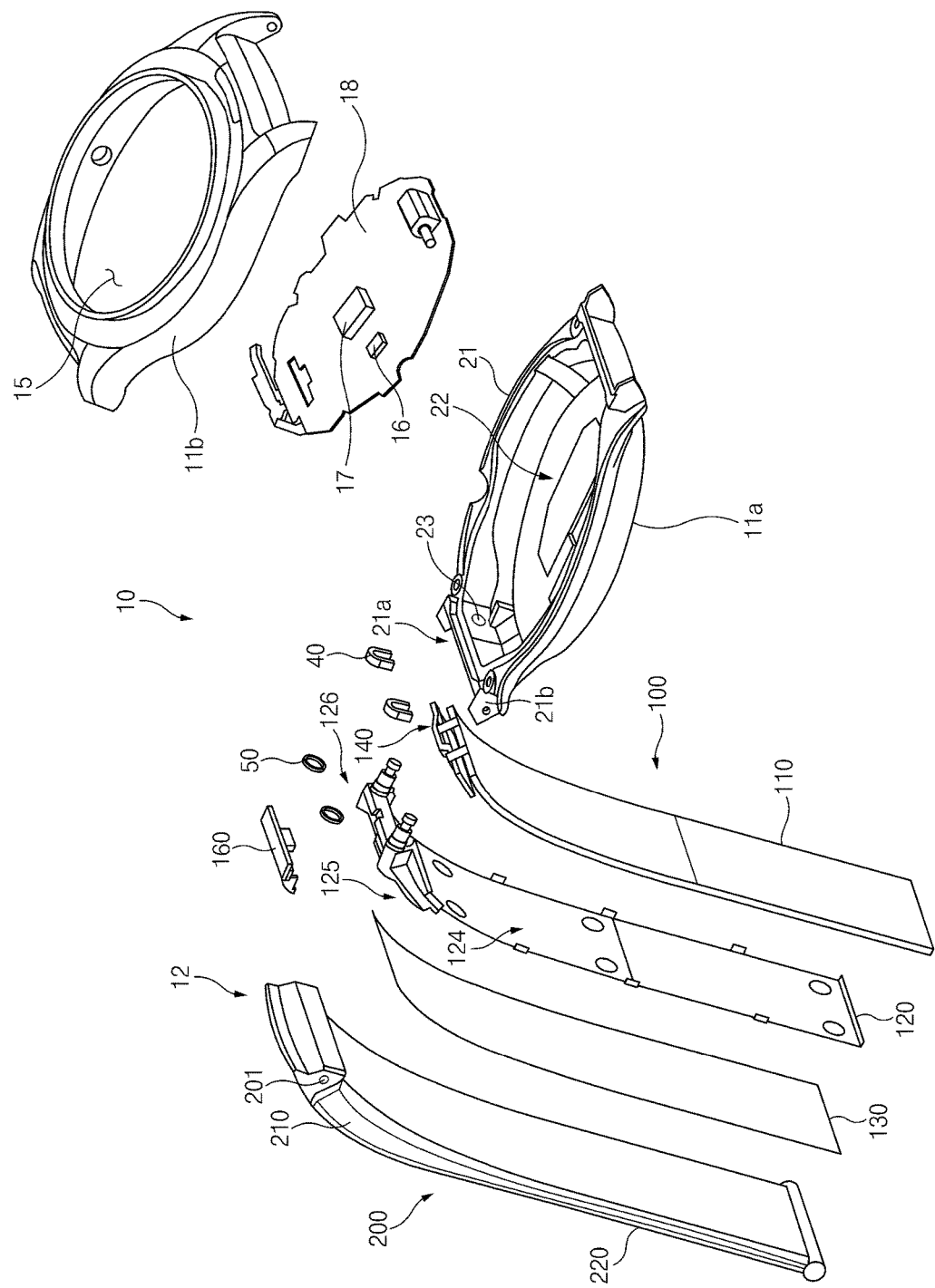
FIG. 2A is an exploded perspective view illustrating an example of a strap, according to an example embodiment of the present disclosure.
Figure 2B:
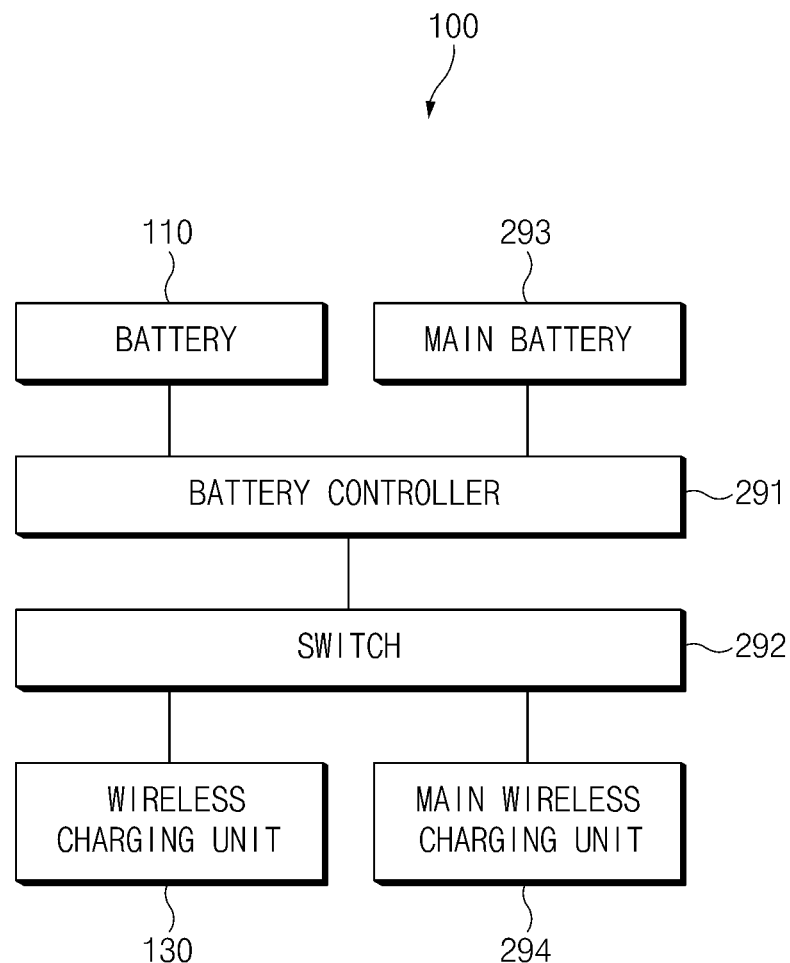
FIG. 2B is a diagram illustrating an example operating environment of a battery which is applicable to an electronic device, according to an example embodiment of the present disclosure.

FIG. 2A is an exploded perspective view of an example strap, according to an example embodiment of the present disclosure. FIG. 2B is a diagram illustrating an example operating environment of a battery which is applicable to the electronic device, according to an example embodiment of the present disclosure.

Referring to FIG. 2A, according to an example embodiment of the present disclosure, the electronic device 10 may include the body 11 and the straps 12.

For example, the body 11 may include a lower housing 11a, an upper housing 11b, and a printed circuit board 18 interposed between the lower housing 11a and the upper housing 11b. In addition, the body 11 may further include the display 15 disposed at one side of the upper housing 11b, the main power supply (not shown), and the like. The processor 17 and the memory 16, which are described above, may be mounted on the printed circuit board 18.

The upper housing 11b may be coupled to the lower housing 11a. The upper housing 11b may include an opening formed in a specific central area thereof such that the display 15 is exposed through the opening. In addition, the upper housing 11b may further include a bezel provided at a peripheral portion of the opening.

The lower housing 11a may include a seating part 21 and a bottom part 22 forming the bottom of the seating part 21. The seating part 21 may have at least one of sidewalls (or band-shaped sidewalls) and may be open upward. A portion of the sidewalls forming the seating part 21 may include, for example, a strap sidewall 21a at an area in which the strap 12 is engaged, a strap engagement part 21b engaged with the strap 12, and a terminal hole 23 into which an electrode rod 126 provided in the strap 12 is inserted. The number of terminal holes 23 may correspond to the number of electrode rods 126. At least portion of the lower housing 11a may be formed of a metallic material or a non-metallic material. The seating part 21 may be provided at one side thereof with the printed circuit board 18 on which the above-described processor 17 is mounted. The printed circuit board 18 may be provided at one side thereof with an electrical contact electrically connected with the electrode rod 126.

The strap 12 may include a strap cover 200 and the battery assembly 100.

The strap cover 200 may be engaged with the body 11 while the strap cover 200 surrounds the battery assembly 100. At least a portion of the strap cover 200 may be formed of various materials such as, without limitation, a leather material, a polymer material, a rubber material, a fiber material, and the like. For example, the strap cover 200 may include an upper strap body 210, which is engaged with the body 11, and a lower strap body 220, which is connected with the upper strap body 210 and longitudinally extends in a direction further away from the body 11. In the upper strap body 210, at least one of a width and an area of an upper portion engaged with the body 11 may be greater than at least one of a width and an area of a lower portion engaged with the lower strap body 220. According to an example embodiment, the thickness of the upper strap body 210 may be gradually increased from the lower portion toward the upper portion (e.g., a portion engaged with the body 11). In addition, the area of the upper strap body 210 may be gradually increased from the lower portion toward the upper portion (e.g., the portion engaged with the body 11). At least one coupling protrusion 201 may be provided on a side portion of the upper strap body 210 such that the coupling protrusion 201 is inserted into and coupled to the hole provided in the strap engagement part 21b of the body 11.

According to various example embodiments, the strap 12 and the body 11 may be engaged with each other in various engagement manners. For example, at least a portion of the side portion of the upper strap body 210 may be provided in the form of a protrusion such that the side portion of the upper strap body 210 is coupled to the strap engagement part 21b. The strap engagement part 21b may include at least one recess or hole such that the strap engagement part 21b is coupled to the coupling protrusion 201. In addition, the coupling protrusion 201 may be formed on the body 11 (e.g., on the strap engagement part), and the recess (e.g., a recess substituting for the coupling protrusion 201) may be formed in the strap 12. According to various embodiments, a spring bar may be mounted on an end portion of the upper strap body 210 and may be elastically coupled to the strap engagement part 21b of the body 11. The end portion of the spring bar may be the coupling protrusion 201. The coupling protrusion 201 may elastically operate in a widthwise direction (in detail, the coupling protrusion 201 may elastically operate to be pressed inward by external force and to protrude outward by a specific distance when the external force is released).

In addition, according to various embodiments, the strap cover 200 may include an upper strap cover to cover an upper surface (e.g., an upper surface of a wireless charging unit 130) of the battery assembly 100 and a lower strap cover to cover a lower surface (e.g., a lower surface of a battery 110) of the battery assembly 100. Accordingly, the battery assembly 100 may be interposed between the upper strap cover and the lower strap cover. According to various embodiments, the strap cover 200 may contain the battery 110 and a battery bracket 120 other than the wireless charging unit 130. In addition, the strap cover 200 may contain the battery 110 and the battery bracket 120 therein. The strap cover 200 may be provided to surround at least a portion of the wireless charging unit 130 having the form of a solar cell (e.g., to surround a side portion and a rear surface of the solar cell except for a surface of the solar cell exposed to the outside for charging).

According to various embodiments, at least a portion of the strap cover 200 surrounding the battery assembly 100 may be formed of a molding material (e.g., a non-conductive molding material or a plastic molding material). To sufficiently form the strap cover 200 using the molding material in a process of forming the strap cover 200, at least a portion of outside-exposed surfaces of the battery 110 or the battery bracket 120 (e.g., an outer surface of the battery 110 or an outer surface of the battery bracket 120 opposite to mutually facing surfaces of the battery 110 and the battery bracket 120 in the state that the battery 110 is seated on the battery bracket 120) may be formed in a pattern to be described in greater detail below with reference FIGS. 6A and 6B.

The electronic device 10 may include various arrangement forms of the strap cover 200 and the battery assembly 100. For example, the electronic device 10 may include the upper strap cover, the battery assembly 100 (e.g. a solar cell having one surface facing the upper strap cover and a battery having one surface facing the lower strap cover), and the lower strap cover. Alternatively, the electronic device 10 may include the upper strap cover, the battery assembly 100 (e.g., a wireless charging unit having one surface facing the upper strap cover and a battery having one surface facing the lower strap cover), and the lower strap cover. In addition, the electronic device 10 may include the upper strap cover, the battery assembly 100 (e.g., the battery having one surface facing the upper strap cover and the wireless charging unit having one surface facing the lower strap cover), and the lower strap cover.

The strap cover 200 may be provided in an integrated type or may separately include the upper strap cover and the lower strap cover as described above, depending on a material of the strap cover 200. For example, in the case that the strap cover 200 is formed of a polymer material, the strap cover 200 may be formed of a molding material for surrounding an outer portion of the battery assembly 100 in the state that the battery assembly 100 is disposed inside the strap cover 200. According to various embodiments, the strap cover 200 may be formed of a leather material. In this case, the upper strap cover and the lower strap cover are separately provided, and the battery assembly 100 is interposed between the upper strap cover and the lower strap cover. In this state, the edges of the upper strap cover and the lower strap cover are combined with each other in a specific manner (e.g., sewing, bonding-compression, or thermo-compression), thereby forming the strap cover 200.

The battery assembly 100 may include the battery 110, the battery bracket 120, the wireless charging unit 130, and a battery protective circuit 140. In addition, the electronic device 10 may further include water-proof members 50, which are coupled to the battery bracket 120, and stoppers 40 which fix the battery bracket 120 to the lower housing 11a of the body 11.

For example, the battery 110 may include a secondary battery. According to an embodiment, the battery 110 may include a lithium ion battery. For example, the battery 110 may include an electrolyte, a positive electrode, and a negative electrode, and a case which surrounds the electrolyte, and the positive electrode, and the negative electrode. Electrode terminals may be provided at a one side of the battery 110 for charging and discharging power. The battery 110 has a shape corresponding to the shape of the strap 12 to have a specific width and a specific length. In this case, the length of the battery 110 may be greater than the width of the battery 110. The battery 110 may be smaller than the strap 12. The battery 110 may be charged with power by the wireless charging unit 130. The battery 110 may supply power to a bracket header 125 disposed in the battery bracket 120 and the components (e.g., the printed circuit board 18, the processor 17, the display 15, and the like) of the body 11 electrically connected with the bracket heater 125.

Referring to FIG. 2B, the electronic device 10 may include the battery 110, a main battery 293, a battery controller 291, a switch 292, the wireless charging unit (e.g., including wireless charging circuitry) 130, and a main wireless charging unit (e.g., including wireless charging circuitry) 294.

According to various embodiments, the electronic device 10 may further include the main wireless charging unit 294 which may include various wireless charging circuitry and may be provided inside the body 11. Accordingly, the electronic device 10 may receive a power signal from a wireless charging device (not illustrated) using the wireless charging unit 130 disposed in the strap 12 and thus may charge power into the battery 11 disposed in the strap 12. The power stored in the battery 110 may be supplied to the main battery 293 of the body 11. According to various embodiments, the main wireless charging unit 294 of the body 11 may charge power into the battery 110 disposed in the strap 12. In this operation, the main wireless charging unit 294 may primarily charge power into the main battery 293 of the body 11. After the charging of the power into the main battery 293 is completed, the main wireless charging unit 294 may charge power into the battery 110 disposed in the strap 12.

According to various embodiments, the power signal received by the main wireless charging unit 294 may be primarily charged into the battery 110 disposed in the strap 12. Then, power stored in the battery 110 may be supplied to the main battery 293 of the body 11. Regarding the power supply, the electronic device 10 may have a power path or a power route related to the power supply. The switch 292 may be interposed between the wireless charging unit 130 and the main wireless charging unit 294. The switch 292 may electrically connect the wireless charging unit 130 or the main wireless charging unit 294 with the battery controller 291 in response to the control of the battery controller 291. At least a portion of the battery controller 291 may include at least one of an electrical circuit or a processor. The battery controller 291 may charge power into the battery 110 or the main battery 293 using at least one of the wireless charging unit 130 or the main wireless charging unit 294 according to a charging condition as described above. Alternatively, the battery controller 291 may supply power, which is stored in the battery 110, to the main battery 293 based on a remaining power amount of the main battery 293.

The battery bracket 120 may protect the battery 110 and may maintain the strap 12 in a specific shape. In addition, the battery bracket 120 may fix and support the wireless charging unit 130. The battery bracket 120 may include a support body 124 and the bracket header 125.

The support body 124 may extend with a specific width in a lengthwise direction. The support body 124 may be formed of a metallic material (e.g., aluminum (Al), an Al alloy, steel use stainless (SUS), or the like). The support body 124 may include a curved part (or a curved area), which includes at least one furrow (or a rail groove) and forms a specific curved surface, and a flat part (or a flat area) continued to the curved part. The bracket header 125 may be disposed in the curved part of the support body 124. As the bracket header 125 may be connected with the support body 124, the bracket header 125 may include a path in which the bracket header 125 is electrically connected with the battery 110 seated on the support body 124.

The bracket header 125 may include a path in which power wirelessly received by the wireless charging unit 130 is transmitted to the battery 110. In other words, at least a portion of the bracket header 125 may be formed of a non-metallic material (e.g., plastic or a polycarbonate (PC) material). For example, the electrode rod 126 may be provided at one side of the bracket header 125.

The electrode rod 126 may be electrically connected with the battery 110 and may be fixedly inserted into the terminal hole 23 provided in the lower housing 11a of the body 110. The support body 124 of the battery bracket 120 may have a thickness in the range of 0.01 mm to 0.2 T mm and may be formed of Al, magnesium (Mg), stainless steel (STS), or the like. In the case that the material of the battery bracket 120 is changed or the size of the strap 12 is changed, the thickness of the support body 124 may be changed. In addition, the electronic device 10 may further include a wire bracket 160 coupled to at least a portion of the bracket header 125.

The wireless charging unit 130 may include various wireless charging circuitry and be seated on and fixed to one side of the battery bracket 120. To this end, the wireless charging unit 130 may be provided in the form of a panel, which has a specific length and a specific width, corresponding to the battery bracket 120. For example, the wireless charging unit 130 may include a circuit pattern and a support substrate on which the circuit pattern is seated. The circuit pattern may cover a specific frequency band such that the circuit pattern receives power transmitted from the wireless charging device. Although drawings illustrate that the support substrate of the wireless charging unit 130 is formed in the shape of a flat surface having no recess or hole, the present disclosure is not limited thereto. For example, the support substrate of the wireless charging unit 130 may have the shape corresponding to that of the battery bracket 120 and thus may include at least one hole. When the wireless charging unit 130 is combined with the battery bracket 120, the hole provided in the support substrate of the wireless charging unit 130 may be aligned with a hole provided in the battery bracket 120. One surface of the wireless charging unit 130 may be disposed on the upper surface of the battery bracket 120, and an opposite surface of the wireless charging unit 130 may be disposed to face the strap cover 200 (e.g., the upper strap cover). Accordingly, the wireless charging unit 130 may receive power wirelessly supplied from the outside of the strap cover 200. According to various embodiments, the wireless charging unit 130 may be disposed inside the battery 110. In this case, one surface of the wireless charging unit 130 may face one side of the battery 110 and an opposite surface of the wireless charging unit 130 may face the strap cover 200 (e.g., the lower strap cover).

The battery protective circuit 140 is coupled to one side of the battery 110 to protect the battery 110. In other words, the battery protective circuit 140 may protect the battery 110 from overcharge, overdischarge, overvoltage, overcurrent, or the like. At least a portion of the battery protective circuit 140 may be formed of a non-metallic material, and at least a remaining portion of the battery protective circuit 140 may include a circuit wiring electrically connected with the battery 110. The battery protective circuit 140 may be fixedly seated on the bracket header 125 provided in the battery bracket 120.

The water-proof member 50 may be coupled to the electrode rod 126 disposed in the battery bracket 120. According to an embodiment, the water-proof member 50 is interposed between the electrode rod 126 and the strap sidewall 21a of the lower housing 11a of the body 11, thereby preventing and/or reducing the likelihood of moisture, water, or foreign matters from being introduced into the body 11. For example, the water-proof member 50 may be formed of a material (e.g., a rubber material) having a specific elasticity and may have a ring shape corresponding to the shape of the electrode rod 126. A plurality of water-proof members 50 may be disposed in number corresponding to the number of electrode rods 126.

The stopper 40 may fix the electrode rod 126 to prevent and/or reduce the likelihood of the electrode rod 126 being separated from the body 11, after the electrode rod 126 is inserted into the terminal hole 23 of the lower housing 11a. The stopper 40 may be provided in a U shape or a horseshoe shape and may be seated into an engraved ring (or a recess in an engraved ring shape) provided in the electrode rod 126, after the electrode rod 126 is inserted into the terminal hole 23. The number of stoppers 40 may correspond to the number of the electrode rods 126. According to various embodiments, the number of the stoppers 40 may be smaller than the number of the electrode rods 126. Accordingly, at least one of the electrode rods 126 may be fixed to the lower housing 11a.

Figure 3:
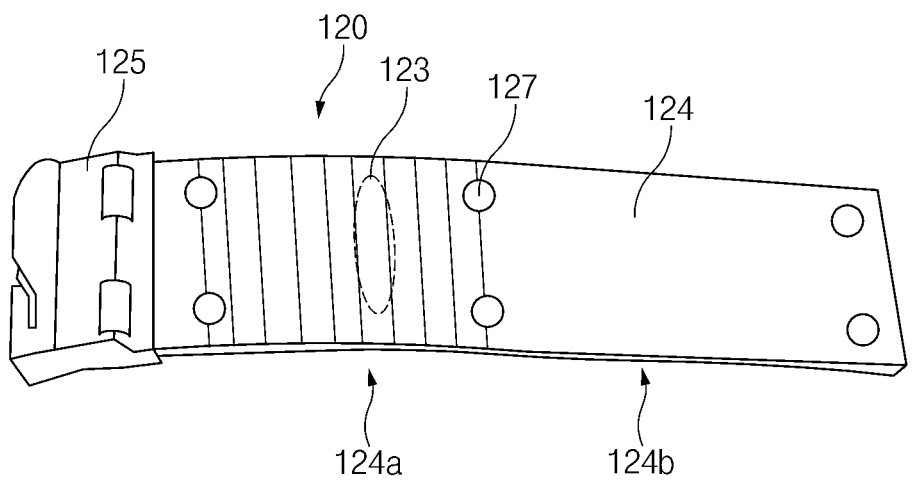
FIG. 3 is a diagram illustrating an example shape of a first surface of a battery bracket, according to an example embodiment of the present disclosure.
Figure 4:
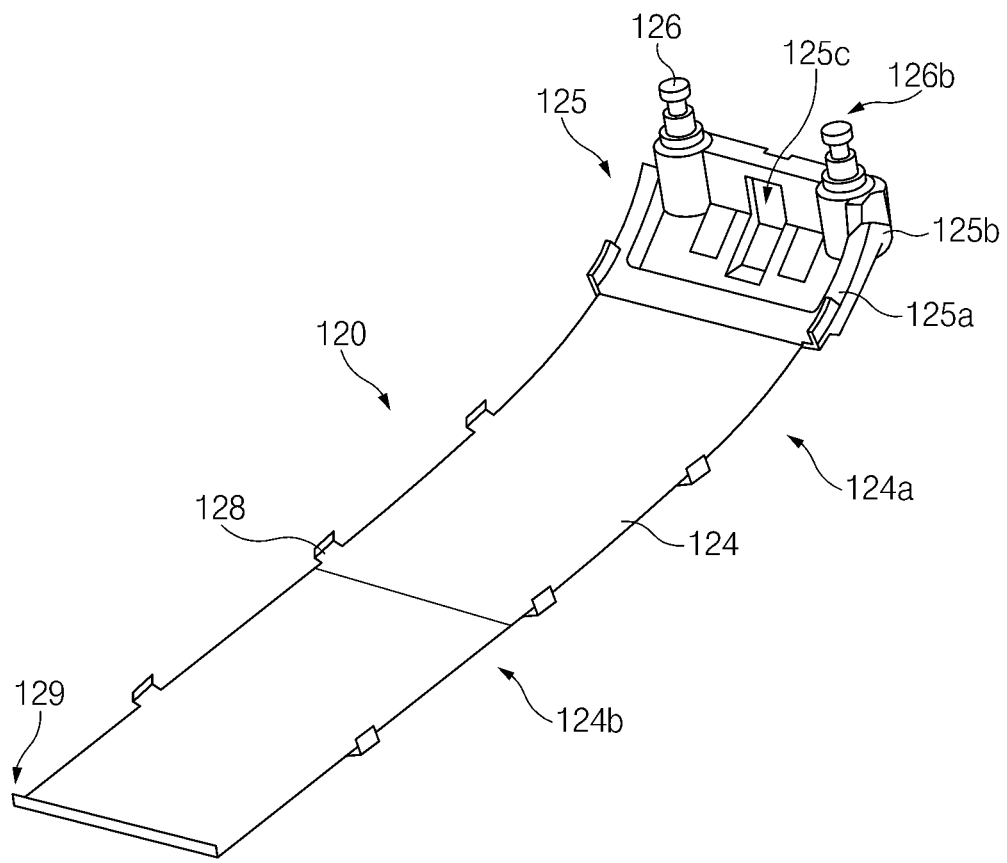
FIG. 4 is a diagram illustrating an example shape of a second surface of a battery bracket, according to an example embodiment of the present disclosure.
Figure 5:
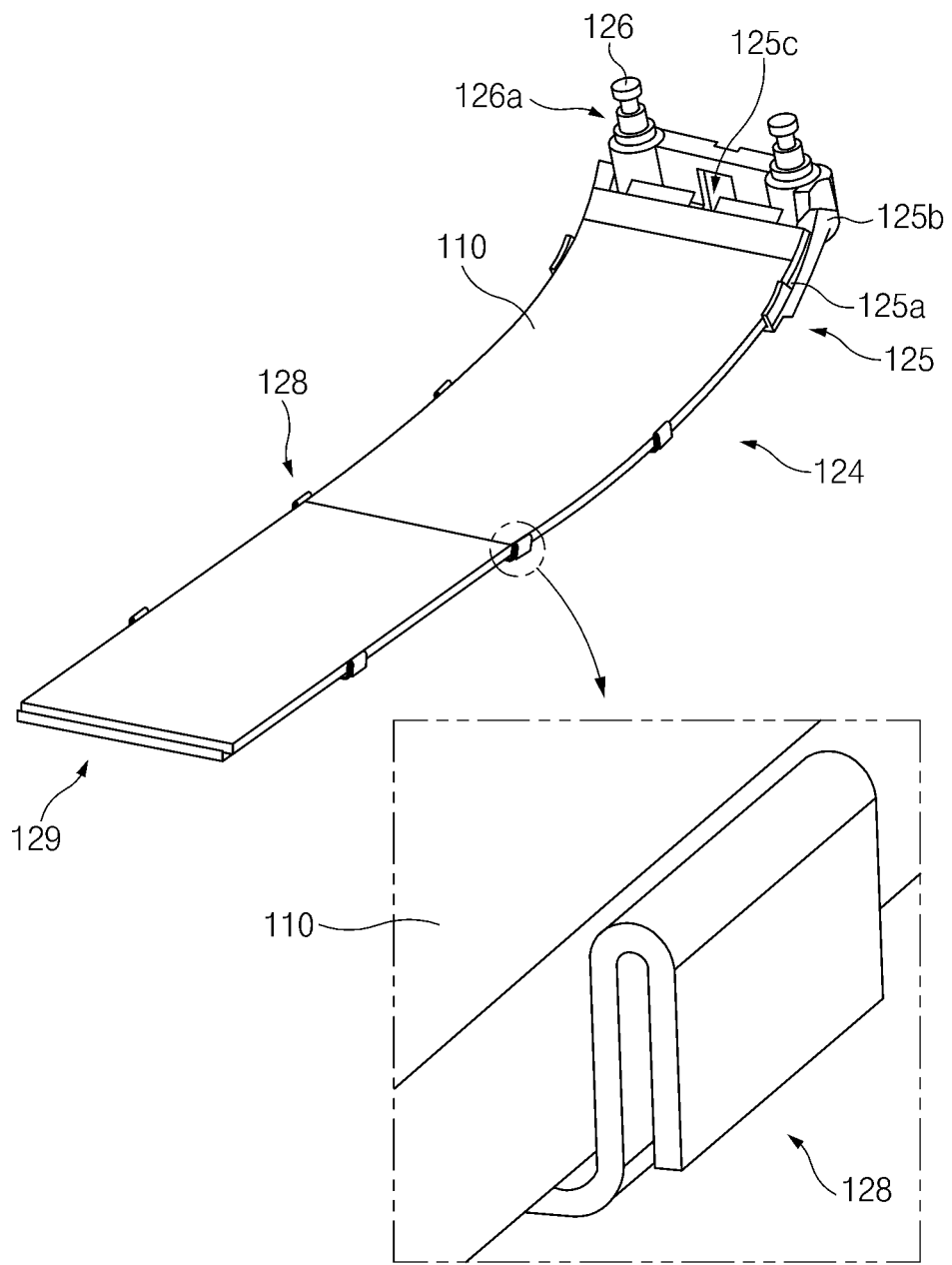
FIG. 5 is a diagram illustrating an example of an assembly of a battery bracket and a battery, according to an example embodiment of the present disclosure.

FIG. 3 is a diagram illustrating an example shape of a first surface of the battery bracket, according to an example embodiment of the present disclosure, FIG. 4 is a diagram illustrating an example shape of a second surface of the battery bracket, according to an example embodiment of the present disclosure, and FIG. 5 is a diagram illustrating an example of the assembly of the battery bracket and the battery, according to an example embodiment of the present disclosure.

As described above, the battery bracket 120 may include the support body 124 and the bracket header 125. The support body 124 may include a curved part 124a and a flat part 124b. In addition, the support body 124 may include at least one of a first guard 128 and a second guard 129 disposed in side portions of the curved part 124a and the flat part 124b, respectively. The first guard 128 and the second guard 129 may guard the battery and the wireless charging unit seated on the support body 124.

The curved part 124a may be disposed such that one side of the curved part 124a is fixedly seated on to one side of the bracket header 125 and an opposite side of the curved part 124a is continued to the flat part 124b. The curved part 124a may include at least one furrow 123. For example, the at least one furrow 123 may be disposed in the first surface (e.g., an opposite surface to the disposition surface of the battery 110) of the support body 124 and may extend in a specific direction (e.g., an axial direction (a lengthwise direction of drawings) or a direction perpendicular to the axial direction). As the furrow 123 is engraved in the first surface, the curved part 124a may have a concaved shape formed in the direction of the first surface. According to various embodiments, the furrow 123 may be engraved in a second surface (e.g., an opposite surface to the first surface) of the support body 124 and thus the curved part 124a may have a concave shape formed in the direction of the second surface. According to an embodiment, a plurality of furrows 123 may be disposed at regular intervals throughout an entire portion of the curved part 124a. Accordingly, the furrows 123 may fixedly maintain the battery bracket 120 with a predetermined curvature and may contribute to improve the flexibility of the battery bracket 120. The number of the furrows 123 and the engraved depths of the furrows may depend on the curvatures of the curved part 124a. According to various embodiments, the engraved depth of the furrow 123 disposed in a portion of the curved part 124a, which has a higher curvature, may be greater than the engraved depth of the furrow 123 disposed in a portion of the curved part 124a which has a lower curvature. For example, the depth of the furrow 123 disposed at an upper side (the side of the bracket header 125) of the central portion or the center of the curved part 124a may be deeper (or shallower) than depths of furrows in other portions. According to various embodiments, the distance between the furrows 123 disposed in the portion (e.g., at the upper side of the central portion or the center of the curved part 124a) of the curved part 124a, which has a higher curvature, may be wider than or narrower than the distance between the furrows 123 disposed in the portion of the curved part 124a which has a lower curvature. According to the present disclosure, the strap 12 may prevent and/or reduce the likelihood of a spring back phenomenon (a phenomenon that a bent substrate returns to a flat state) based on at least one furrow 123 of the battery bracket 120. In the case that the flat part 124b is continued to an opposite side of the curved part 124a, the flat part 124b may be disposed with a specific length and a specific width. The width and the thickness of the flat part 124b may be equal to the width and the thickness of the curved part 124a. According to various embodiments, the furrow 123 may be disposed in a specific pattern. For example, although drawings illustrate that a plurality of furrows 123 are linearly arranged in a widthwise direction of the support body 124, the present disclosure is not limited thereto. For example, as engraved strips may be provided in a zig-zag pattern, a plurality of furrows 123 may be arranged in a widthwise direction of the support body 124. In other words, the furrows 123 in the linear shape illustrated in drawings may be substituted with the zig-zag pattern.

Referring to FIG. 5, the first guard 128 may support the battery 110 seated on the battery bracket 120 to prevent and/or reduce the likelihood of the battery 110 from being separated from the support body 124. First guards 128 may extend to a specific height from edges of the curved part 124a and the flat part 124b with a specific angle (e.g., an angle at which the first guards 128 are perpendicular to bottoms of the curved part 124a and the flat part 124b). For example, the first guards 128 may be disposed at mutually symmetrical positions of both edges of the curved part 124a and may be disposed at mutually symmetrical positions of both edges of the flat part 124b. In addition, at least one first guard 128 may be disposed in at least one position of both edges of the curved part 124a and both edges of the flat part 124b. The height of the first guard 128 may be formed in such a manner that the battery 110 is prevented and/or resistant from moving. For example, the height of the first guard 128 may be formed approximately to the thickness of the battery 110 or may be formed less than the thickness of the battery 110. In addition, the height of the first guard 128 may be greater than the thickness of the battery 110 depending on design change. An upper end portion of the first guard 128 may be rounded or folded to prevent and/or reduce the likelihood of the battery 110 from being nicked. As illustrated in FIG. 5, the first guard 128 has a folding shape.

The second guard 129 may be provided while forming a specific angle (e.g., an angle equal to or approximating to an angle of the first guard 128) with respect to an end portion of the flat part 124b (an opposite end to one side of the flat part 124b connected with the curved part 124a). The second guard 129 may prevent and/or reduce the likelihood of the battery 110, which is seated on the battery bracket 120, from being separated from the curved part 124a to the flat part 124b. The height of the second guard 129 may be equal to or approximate to the height of the first guard 128. In addition, the height of the second guard 129 may be designed independently from the height of the first guard 128.

As illustrated in FIG. 3, the support body 124 may include at least one fixing hole 127. For example, at least one fixing hole 127 may be provided in each of the curved part 124a and the flat part 124b. The fixing hole 127 may be used to align or fix the battery bracket 120 in the process of forming the strap cover 200. The number and the arrangement of the fixing holes 127 may be varied depending on design change. For example, two fixing holes 127 may be provided in each of an upper end portion of the curved part 124a, a boundary between the curved part 124a and the flat part 124b, and a lower end portion of the flat part 124b. In addition, four to ten fixing holes 127 may be provided. The fixing holes 127 may be used to seat the battery bracket 120 in a mold. In addition, the fixing holes 127 may reduce the weight of the battery bracket 120 and may increase the flexibility of the battery bracket 120.

The battery bracket 120 may include an engagement header 125a which fixes at least one side of the support body 124 (e.g., one side of the curved part 124a) and a header sidewall 125b which protrudes upward (e.g., toward a side facing the battery 110) from the surface of the support body 124. In addition, the bracket header 125 may include electrode rods 126a and 126b, which are provided on both end portions of the header sidewall 125b, and a wiring hole 125c formed through front and back surfaces of the header sidewall 125b in the central portion of the header sidewall 125b. A hole may be formed in a rear surface of the engagement header 125a such that one side of the support body 124 protrudes through the hole. The bracket header 125 may be formed around the support body 124 and formed of a molding material. The electrode rods 126a and 126b may be disposed while passing through the front and rear surfaces of the header sidewall 125b. Each of the electrode rods 126a and 126b may be provided in the shape of a metallic rod. Each of the electrode rods 126a and 126b may include the engraved ring formed in at least one side thereof. The stopper 40 may be engaged with the engraved ring. One side of the battery 110 (e.g., an area in which the battery protective circuit 140 is disposed) may be seated on the bracket header 125. The electrode rods 126a and 126b may be formed together with the bracket header 125 in the process of forming the bracket header 125 through insert-molding such that the electrode rods 126a and 126b may be integrated with the battery bracket 120.

Figure 6A:
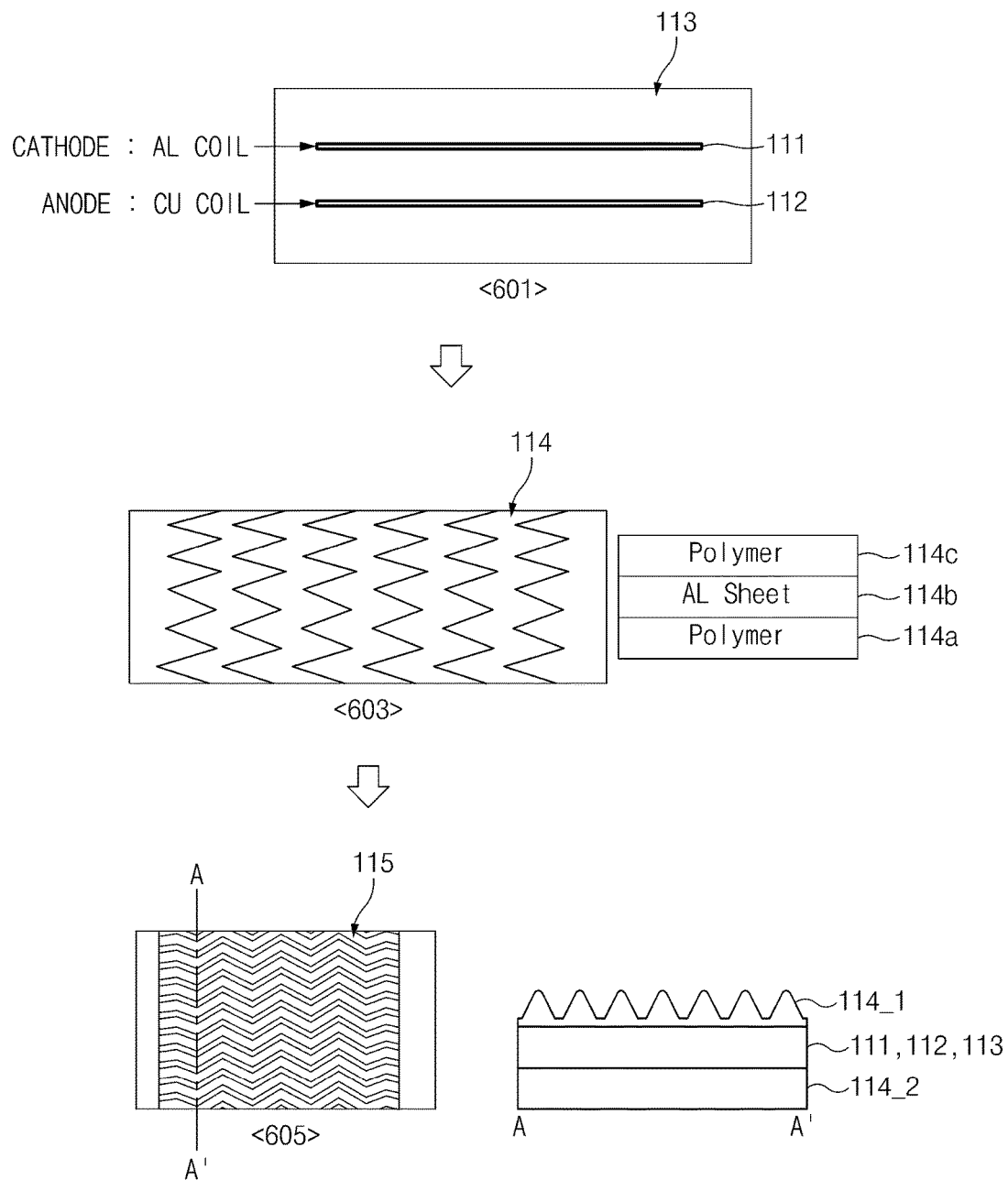
FIG. 6A is a diagram illustrating an example process of manufacturing a battery, according to an example embodiment of the present disclosure.

FIG. 6A is a diagram illustrating an example process of manufacturing the battery, according to an example embodiment of the present disclosure.

Referring to FIG. 6A, according to an example embodiment of the present disclosure, the battery 110 may include a first electrode plate 111, a second electrode plate 112, and an electrolyte 113 as illustrated in state 601. As illustrated in state 603, the battery 110 may include a case 114 surrounding the first electrode plate 111, the second electrode plate 112, and the electrolyte 113 which are laminated. For example, the first electrode plate 111 may include an aluminum (Al) coil, and the second electrode plate 111 may include a copper (Cu) coil. A plurality of first electrode plate 111 and a plurality of electrode plates 112 may be laminated on each other at specific intervals. The materials and the shapes of the first electrode plate 111 and the second electrode plate 112 may be described for an illustrative purpose. According to the present disclosure, the battery 110 may include electrodes formed of various metallic materials.

The case 114 may include a rigid substrate (e.g., an Al sheet) having at least one surface on which a pattern may be formed. For example, as illustrated in state 603, the at least one surface of the case 114 may have the form in which a first polymer 114a, a rigid layer 114b, and a second polymer layer 114c are laminated on each other. For example, the rigid layer 114b may be located on an opposite surface to a surface of the case 114 facing the battery bracket 120. An area of the case 114 in which the rigid layer 114b is disposed may include a specific pattern (e.g., a wave pattern). To this end, a mold may be prepared corresponding to the specific pattern, the case 114 may be disposed in the mold, and then the pattern may be formed with specific heat at a specific temperature under specific pressure. According to the embodiment, the specific pattern may include a first sub-pattern, which is repeated in a first direction (e.g., a first oblique direction), and a second sub-pattern, which is repeated in a second direction (e.g., a second oblique direction disposed perpendicularly to the first oblique direction) different from the first direction. In addition, the specific pattern may include a passage formed at a space between the first sub-pattern and the second sub-pattern, in addition to the first sub-pattern and the second sub-pattern.

As illustrated in state 605, the case 114 having the specific pattern 115 formed on an outer portion thereof includes a plurality of first electrode plates (positive electrode plates) 111, a plurality of second electrode plates (negative electrode plates) 112, which are laminated on each other, and the electrolyte 113. The first and second electrode plates (e.g., the positive and negative electrode plates) having specific areas may be flat without a curved pattern. In the case 114, an upper case 114_1 may be patterned, and a lower case 114_2 may not be patterned (may have a plain pattern). Alternatively, patterns may be formed on the upper case 114_1, the lower case 114_2, and a side portion of the case 114.

The pattern formed on the case 114 may prevent and/or reduce the likelihood of the battery 110 being broken (due to the accumulation of fatigue repeatedly occurring in a section which is arbitrarily folded). In addition, the pattern formed on the case 114 may improve the rate (fluidity) of a molding material (or resin) in an insert-molding process of forming the strap 12. For example, in the insert-molding process of forming the strap 12, if the molding material is filled in the mold, the filled molding material may be uniformly spread throughout the inner entire portion of the mold while the filled molding material is moving along the specific pattern 115.

Figure 6B:
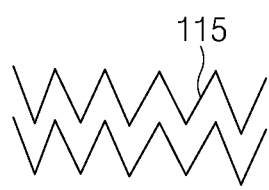
FIG. 6B is a diagram illustrating another example of a furrow shape of a battery, according to an example embodiment of the present disclosure.
Figure 6B:
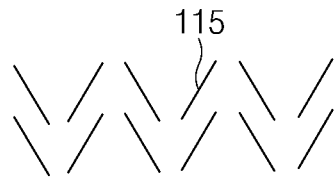
Figure 6B:
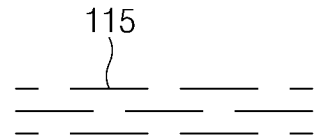
Figure 6B:
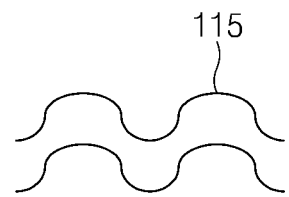
Figure 6B:
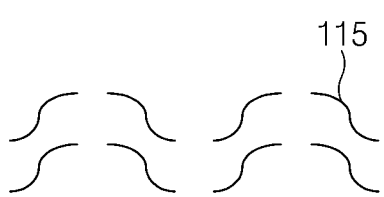

FIG. 6B is a diagram illustrating another example of the furrow shape of the battery, according to an example embodiment of the present disclosure.

As illustrated in FIG. 6B, the specific pattern 115 formed on the case 114 of the battery 110 may have various shapes. For example, as illustrated in state 631, the specific pattern 115 may include a zig-zag pattern (a plurality of patterns having valleys and hills which are repeated). As illustrated in state 633, the specific pattern 115 may have the shape of a zig-zag pattern broken at inflection points (e.g., the shape of a pattern having protrusions inclined at 45 degrees and arranged in a zig-zag manner). In state 633, as the patterns are continuously broken at the inflection points, portions of the patterns, which are broken at the inflection points, may have the shape of passages. Accordingly, in the insert-molding process, the mold material may more rapidly and easily move through the passages while forming the strap 12.

The specific pattern 115 may be provided in an embossment shape as illustrated in state 635. The case 114 having the pattern provided in the embossment shape includes a plurality of protrusions protruding from the surface of the case 114 and a plurality of recesses. Each protrusion and each recess may have a semi-spherical shape. The specific pattern 115 may be provided in an embossment shape as illustrated in state 637. The specific pattern 115 may include portions broken between protrusions, between recesses, or between the protrusion and the groove. The broken portions may serve as passages in the tops of repeated embossment pattern similarly to the pattern shown in state 633.

According to various embodiments, the specific pattern 115 may include a plurality of linear patterns having gaps (breaks or spaces), which are repeated in a left-right direction (or widthwise direction), and disposed in an up-down direction (or lengthwise direction) as illustrated in state 639. In this case, positions of gaps may be matched with each other in the up-down direction, or may be unaligned in a zig-zag shape, as illustrated in drawings. If the positions of the gaps are unaligned in the up-down direction, an insert-molding filling material (molding material or resin) may be easily filled to left and right end portions of the case 114 in an insert-molding process. Simultaneously, the filling material may be filled to a lower end portion of the case 114 through the gaps aligned in the up-down direction, thereby forming the strap 12. According to an embodiment, various patterns described above are partially formed throughout the case 114. In addition, among the patterns described with reference to FIG. 6B, at least one pattern may be at least partially formed on at least one surface (e.g., a surface on which the strap cover is formed) of the battery bracket 120.

According to various example embodiments described above, the battery according to an example embodiment of the present disclosure may include at least one pair of a negative electrode plate and a positive electrode plate spaced apart from each other by a specific distance, an electrolyte disposed around the negative electrode plate and the positive electrode plate, and a case surrounding the negative electrode plate, the positive electrode plate, and the electrolyte. The case may have a plurality of zig-zag patterns having hills and valleys in at least portions thereof and disposed in a specific direction.

According to various example embodiments, the case may include a first polymer layer, which surrounds the negative electrode plate, the positive electrode plate, and the electrolyte, a metallic layer, which surrounds the first polymer layer while forming the zig-zag pattern, and a second polymer layer which is disposed to cover the metallic layer and to form the zig-zag pattern.

According to various example embodiments, the first polymer layer may be formed in the zig-zag pattern.

According to various example embodiments, the zig-zag pattern may further include gaps disposed at the inflection areas of a plurality of zig-zag patterns disposed in the first direction.

According to various example embodiments, the gaps may be disposed while being unaligned in the second direction.

According to various example embodiments, the strap according to an embodiment of the present disclosure may include a battery having a specific width, a specific thickness, and a specific length, a battery bracket having a size approximate to or greater than the size of the battery, seating the battery, and having a part curved with a specific curvature, and a strap cover surrounding the battery bracket on which the battery is seated. A case of the battery may have a pattern protruding in a first direction and a pattern protruding in a second direction different from the first direction. The first direction and the second direction may have specific gradients (e.g., having an angle in the range of 10° to 90°, in detail, an angle of 45°). In addition, the case may include a passage formed in a space between the pattern in the first direction and the pattern in the second direction. At least a portion of the case may include a first polymer layer which surrounds contents, a rigid layer (e.g., an aluminum sheet) used to form a pattern on the first polymer layer, and a second polymer layer which covers the rigid layer.

According to various example embodiments, an electronic device according to an embodiment may include a strap, which includes a battery having a case, on which a first directional pattern and a second directional pattern are formed, a battery bracket supporting the battery, and a strap cover surrounding the battery bracket, and a body coupled to at least one strap.

Figure 7:
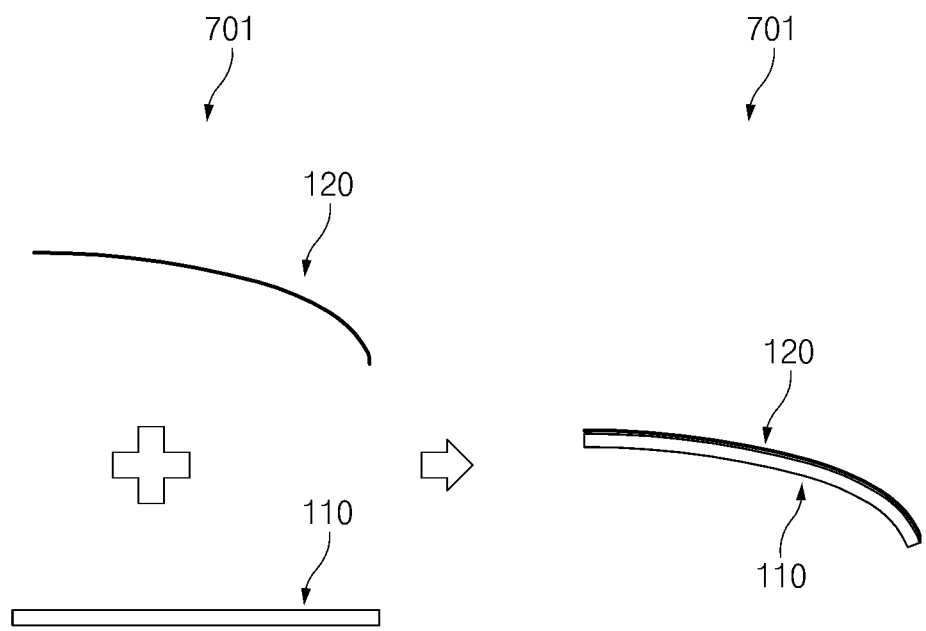
FIG. 7 is a diagram illustrating an example of a process of coupling a battery bracket to a battery, according to an example embodiment of the present disclosure.

FIG. 7 is a diagram illustrating an example of a process of coupling the battery bracket to the battery, according to an example embodiment of the present disclosure.

Referring to FIG. 7, in state 701, the battery 110 may have a top surface and a bottom surface, which are flat, and may have a specific width, a specific thickness, and a specific area. For example, the size and the thickness of the battery 110 may be determined depending on the shape of the strap 12 disposed in the electronic device 10. In state 703, the battery bracket 120 may include a curved part formed as at least a portion of the battery bracket 120 is curved at a specific angle with respect to at least one furrow. The curvature of the battery bracket 120 may be varied depending on the size of the distance between furrows and the depth of an engraved portion (or a groove) forming each furrow.

If the flat battery 110 is seated on the battery bracket 120 having a specific curvature, or if the flat battery 110 is seated on the battery bracket 120 having the specific curvature while pressing the battery bracket 120, the battery 110 may be seated on the battery bracket 120 in the state that the battery 110 is curved along the shape of an outer appearance of the battery bracket 120 which is curved with the specific curvature. At least one first guard 128 and at least one second guard 129 disposed on the battery bracket 120 may prevent and/or reduce the likelihood of the battery 110 from being separated from the surface of the battery bracket 120. In addition, the first guard 128 and the second guard 129 may support the battery 110 such that the battery 110 is maintained in a curved state on the surface of the battery bracket 120. According to various embodiments, the first guard 128 and the second guard 129 may support inner components (e.g., the battery and the wireless charging unit) to maintain the mounting state of the inner components, when the insert-molding for the strap 12 is performed.

Figure 8:
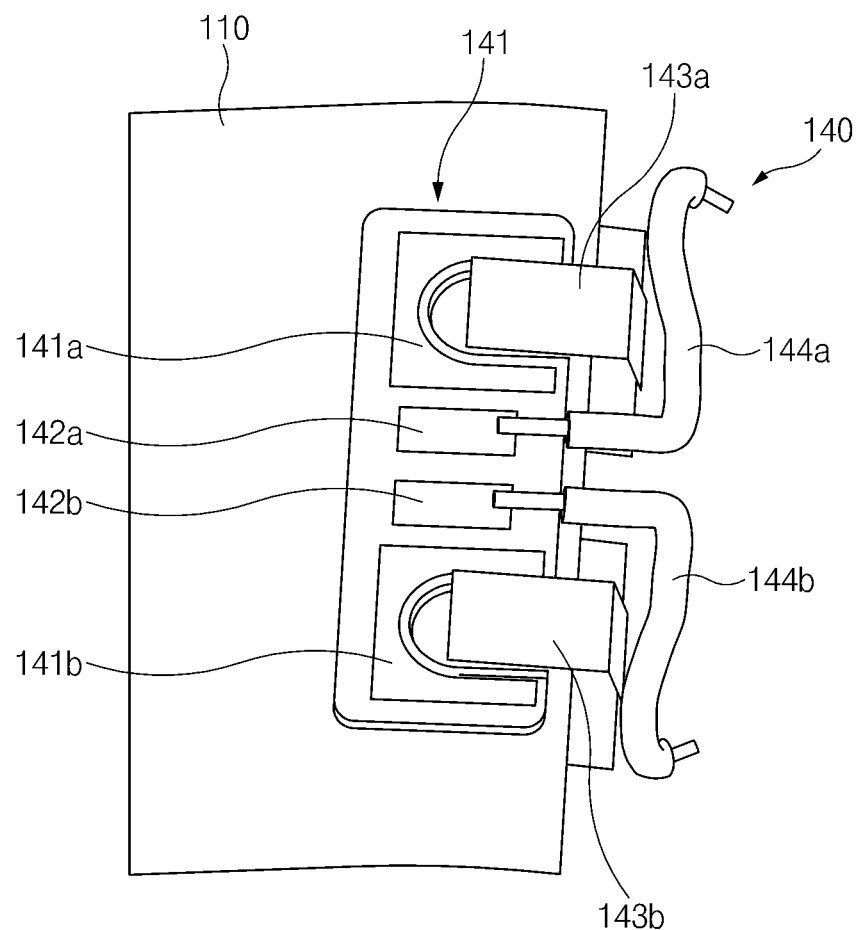
FIG. 8 is a diagram illustrating an example of a battery protective circuit, according to an example embodiment of the present disclosure.
Figure 9:
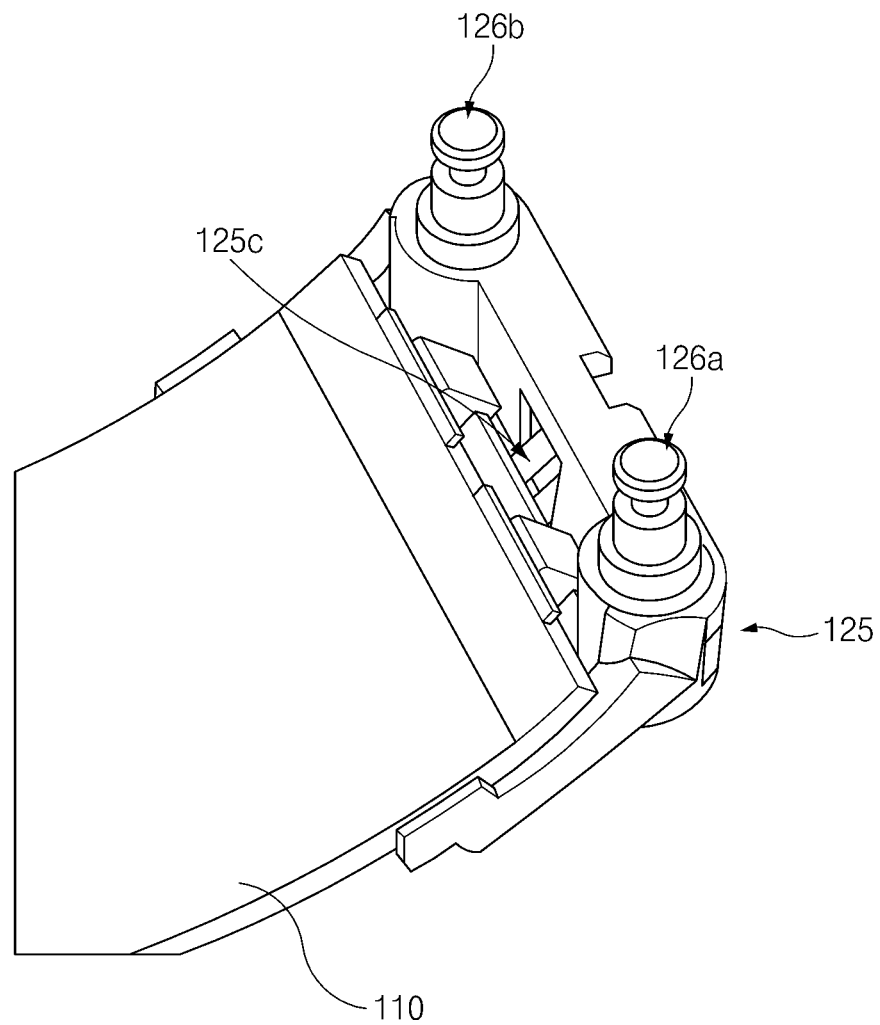
FIG. 9 is a diagram illustrating an example of a bracket header surrounding a battery protective circuit, according to an example embodiment of the present disclosure.

FIG. 8 is a diagram illustrating an example of a battery protective circuit, according to an example embodiment of the present disclosure, and FIG. 9 is a diagram illustrating an example of a bracket header surrounding the battery protective circuit, according to an example embodiment of the present disclosure.

Referring to FIGS. 8 and 9, according to an example embodiment of the present disclosure, the battery protective circuit 140 may include a circuit board 141, protective members 143a and 143b, and wires 144a and 144b.

The circuit board 141 may be disposed at one side of the battery 110 and may be electrically connected with the positive electrode plate and the negative electrode plate disposed inside the battery 110. To this end, contacts may be exposed through one side of the case 114 to seal an inner part of the case 114 while the contacts are electrically connected with the positive electrode plate and the negative electrode plate. The circuit board 141 may be electrically connected with contacts exposed through the case 114. The circuit board 141 may include a first contact 141a and a second contact 141b, which are connected with the protective members 143a and 143b, respectively, and a positive contact 142a and a negative contact 142b which are connected with the wires 144a and 144b, respectively. On the upper surface of the circuit board 141, at least a portion may be insulated other than portions connected with the protective members 143a and 143b and the wires 144a and 144b. Among portions of the circuit board 141 connected with the protective members 143a and 143b and the wires 144a and 144b, at least a portion may be insulated.

The protective members 143a and 143b may be electrically connected with the first contact 141a and the second contact 141b provided on the circuit board 141. The protective members 143a and 143b may protect the battery 110 under the control of the processor 17 disposed in the printed circuit board 18 of the body 11. For example, the protective members 143a and 143b may be provided to protect the battery 110 from overcharge, overdischarge, overvoltage, overcurrent, or the like.

The wires 144a and 144b may include the first wire 144a and the second wire 144b which are electrically connected with the positive contact 142a and the negative contact 142b provided on the circuit board 141, respectively. The first wire 144a and the second wire 144b may be disposed in the state that the first wire 144a and the second wire 144b are soldered to the positive contact 142a and the negative contact 142b.

The first wire 144a may be disposed to an outside of the bracket header 125 (in detail, disposed leftward of an outside of an area on which the battery 110 is seated) through the wiring hole 125c provided in the bracket header 125. Similarly, the second wire 144b may be disposed to an outside of the bracket header 125 (in detail, rightward of the outside of an area on which the battery 110 is seated) through the wiring hole 125c provided in the bracket header 125. The battery 110 may be seated on the battery bracket 120 and an area of the battery 110, in which the battery protective circuit 140 is disposed, may be fixedly seated on the bracket header 125. In this case, the bracket header 125 may include at least one recess having the shape corresponding to the shape of the battery protective circuit 140 and formed inside of the bracket header 125. In detail, the bracket header 125 may include a plurality of recesses, in which the protective members 143a and 143b are seated, and wiring recesses in which the wires 144a and 144b are disposed. One end portion of the wiring recess may communicate with the wiring hole 125c. The first wire 144a may be electrically connected with the first electrode rod 126a among the electrode rods. In addition, the second wire 144b may be electrically connected with the second electrode rod 126b among the electrode rods.

Figure 10:
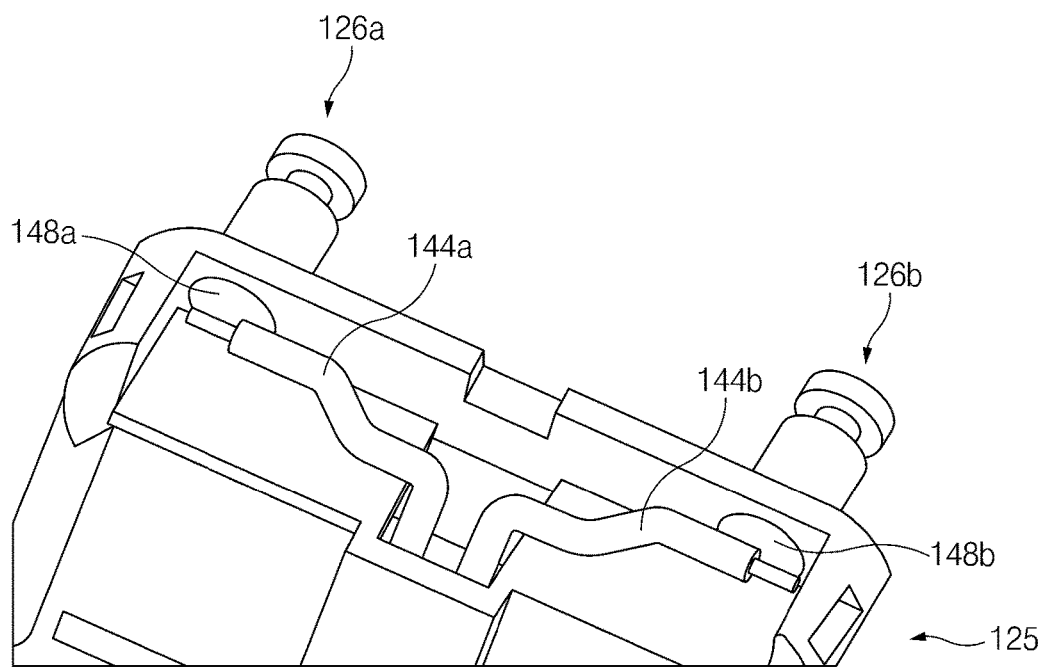
FIG. 10 is a diagram illustrating an example first surface of a bracket header, according to an example embodiment of the present disclosure.
Figure 11:
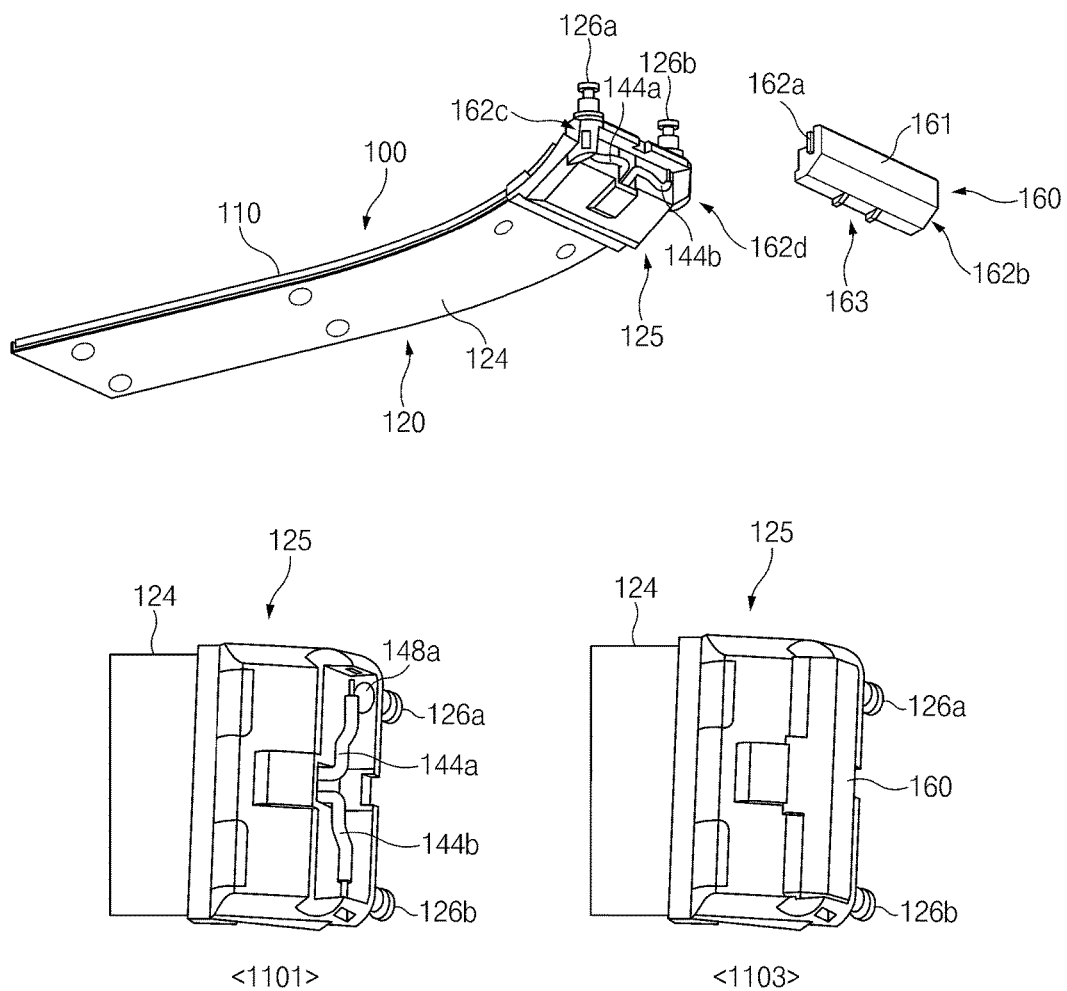
FIG. 11 is a diagram illustrating an example process of assembling a battery header of a battery bracket, according to an example embodiment of the present disclosure.
Figure 12:
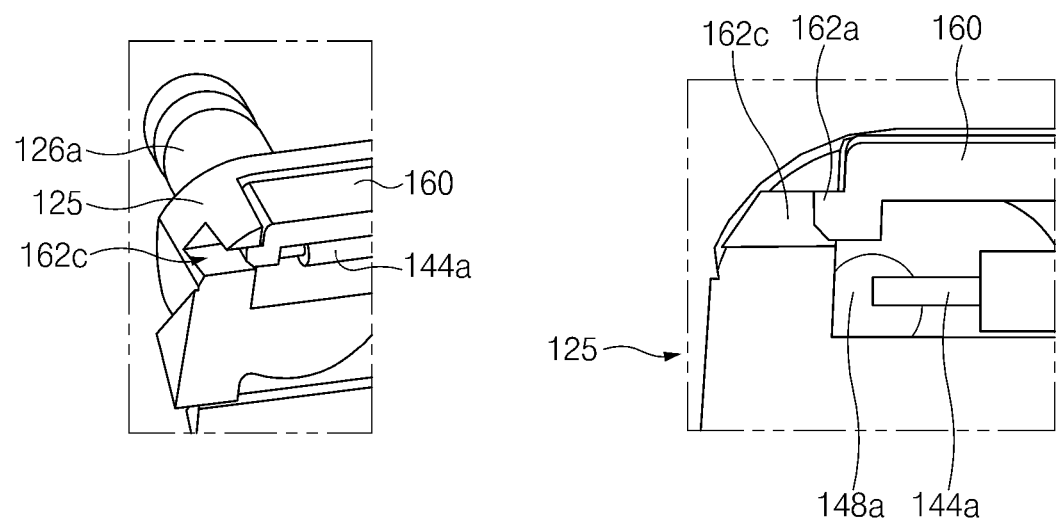
FIG. 12 is a diagram illustrating an example coupling state of a bracket header and a wire bracket, according to an example embodiment of the present disclosure.

FIG. 10 is a diagram illustrating an example first surface of an example bracket header, according to an example embodiment of the present disclosure. FIG. 11 is a diagram illustrating an example process of assembling a bracket header of a battery bracket, according to an example embodiment of the present disclosure. FIG. 12 is a diagram illustrating an example coupling state of the bracket header and a wire bracket, according to an example embodiment of the present disclosure.

Referring to FIGS. 10 to 12, the wires 144a and 144b, which are disposed in the battery 110 as described with reference to FIGS. 8 and 9, may be disposed on an outer surface (e.g., an outer surface opposite to a surface on which the battery 110 is seated) of the bracket header 125. For example, based on the drawings, the first wire 144a (or the second wire 144b) is disposed at the right side (or the left side) of the bracket header 125, and the second wire 144b (or the first wire 144a) may be disposed at the left side (or the right side) of the bracket header 125. As at least a portion of a sheath is removed from one end portion of the first wire 144a, a line may be exposed through the sheath and may be electrically connected with a first solder part 148a electrically connected with the first electrode rod 126a. Similarly, as the sheath is removed from one end portion of the second wire 144b, a line may be exposed through the sheath and may be electrically connected with a second solder part 148b electrically connected with the second electrode rod 126b.

After the first wire 144a electrically connected with the first electrode rod 126a and the second wire 144b electrically connected with the second electrode rod 126b are provided, the bracket header 125 may be coupled to the wire bracket 160. The wire bracket 160 may be disposed to surround a specific space of the bracket header 125 in which the first wire 144a and the second wire 144b are disposed. For example, the wire bracket 160 may include a guide recess 163 which is formed on one side of a cover 161 to guide portions protruding due to the wiring recesses of the bracket header 125. The above-described wire bracket 160 may be coupled to surround one side of an outer surface of the bracket header 125, and the wires 144a and 144b exposed in state 1101 may be hidden as illustrated in state 1103. Accordingly, the wire bracket 160 may reduce insert-molding pressure applied to the battery protective circuit 140 in the process of forming the strap 12, thereby preventing and/or reduce the likelihood of the wires 144a and 144b from being disconnected from being each other.

The wire bracket 160 may protect the soldered portions of the wires 144a and 144b during the process of forming the strap 12 in the battery assembly 100. The wire bracket 160 may securely maintain the electrical connection relationship between the battery bracket 120 and the battery 110. In addition, the wire bracket 160 may support the bracket header 125 on which the electrode rods 126a and 126b are disposed while the wire bracket 160 improves the stiffness of the bracket header 125.

The wire bracket 160 may include the cover 161, which surrounds recesses for the dispositions of the first wire 144a and the second wire 144b, and hook protrusions 162a and 162b provided at both sides of the cover 161 and coupled to hook recesses 162c and 162d provided in the bracket header 125. The first hook recess 162c of the hook recesses 162c and 162d, into which the first hook protrusion 162a is fixedly inserted, may be disposed adjacent to a specific area in which the first electrode rod 126a is disposed as illustrated in FIG. 12. The first hook protrusion 162a provided at a side portion of the cover 161 may be inserted into the first hook recess 162c while the second hook protrusion 162b is inserted into the second hook recess 162d. Accordingly, the cover 161 may protect the wires 144a and 144b from external impact.

Figure 13:
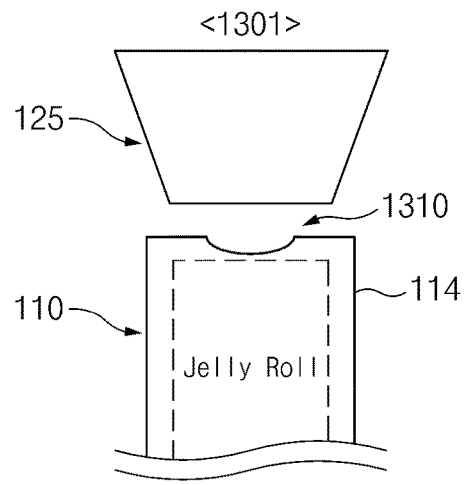
FIG. 13 is a diagram illustrating an example of the coupling structure of a battery protective circuit in a battery assembly, according to an example embodiment of the present disclosure.
Figure 13:
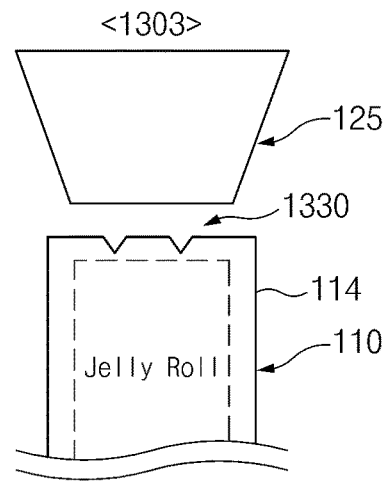
Figure 13:
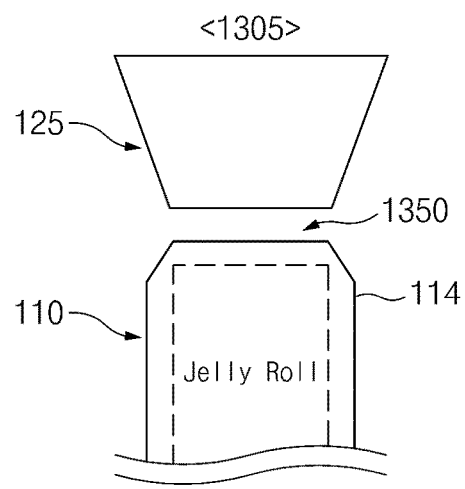
Figure 13:
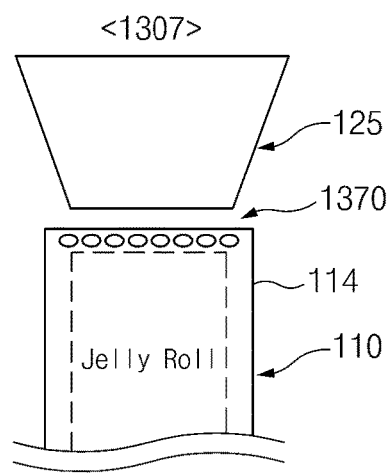

FIG. 13 is a diagram illustrating an example of an example coupling structure of a battery assembly, according to an example embodiment of the present disclosure.

Referring to FIG. 13, according to an example embodiment of the present disclosure, a battery structure may include the battery 110 and the bracket header 125 having the battery protective circuit 140 disposed therein. The bracket header 125 may be disposed at one side of the battery 110 to form a power moving path (or a power supply path) of the battery 110 while protecting the battery 110. According to the present disclosure, the battery 110 may include, for example, a rechargeable lithium battery. Accordingly, as the battery 110 is repeatedly used, is over-charged, and is applied thereto with external impact, the internal gas of the battery 110 may be generated and thus the battery 110 may be swollen or exploded. Accordingly, the battery 110 may deform a product outer appearance of the strap 12 and may cause the damage to inner components. In addition, as the battery 110 directly makes contact with the human body of a user, the battery 110 may cause the damage, such as a burn, to the user. To prevent and/or reduce the likelihood of damage, the battery 110 may have at least one weak part to remove internal pressure before an accident occurs. The weak part may be located in the vicinity of coupling parts of a product, which have structures suitable for the protection of the human body of the user (e.g., the weak part may be located in the vicinity of an area in which the bracket header 125 is disposed). Further, an additional structure may be included to protect the human body of the user when gas or a liquid leaks.

For example, the battery 110 may include a pressure reduction inducing part (or the weak part) provided at a coupling part with the bracket header 125 so as to remove the internal pressure resulting from the generation of the gas. To provide the pressure reduction inducing part, the case 114 may be provided to have one side thinner than an opposite side in thickness, or to have one side weaker than the opposite side in durability, in the structure in which the case 114 surrounds the contents (e.g., the positive and negative electrode plates and the electrolyte, or a jelly roll) of the battery 110.

According to an embodiment, as illustrated in state 1301, the battery 110 may include a first inducing part 1310 provided at a side portion coupled to the bracket header 125 and having a semi-circular shape. In addition, as illustrated in state 1303, the battery 110 may include at least one second inducing part 1330 provided at the side portion coupled to the bracket header 125 and having a wedge shape. In state 1305, the battery 110 may include at least one third inducing part 1350 provided at the side portion coupled to the bracket header 125 and having a tempered shape. For example, the third inducing part 1350 may be disposed at the edge of one side of the battery 110. In state 1307, the battery 110 may include at least one fourth inducing part 1370 provided at the side portion coupled to the bracket header 125 and having a nicked (or punched) shape. The fourth inducing part 1370 may be interposed with a plurality of nicks (or bores) between an end portion of the edge of the case 114 and an area in which the contents are disposed. The battery 110 having the at least one inducing part may be prevented and/or reduce a likelihood of being exploded by reducing internal pressure as gas is discharged through the at least one inducing part when the internal pressure of the battery 110 is increased.

Figure 14:
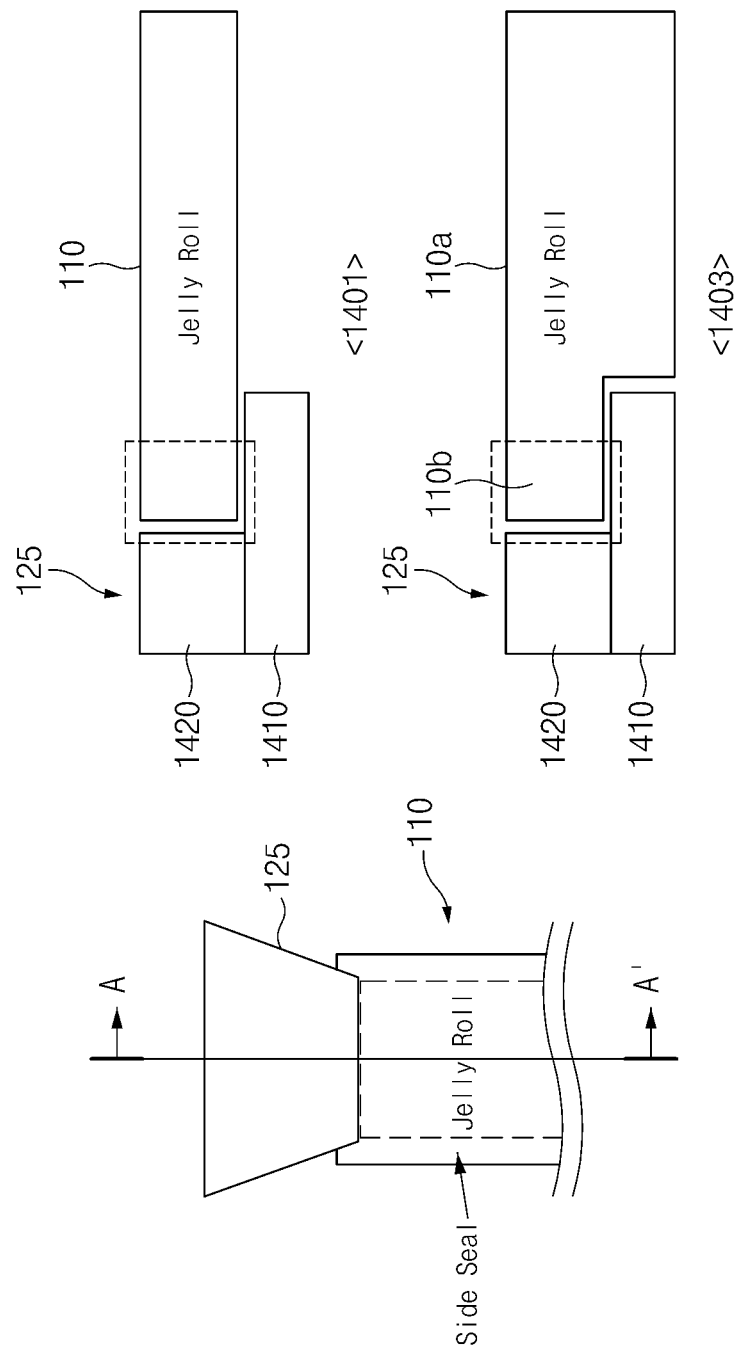
FIG. 14 is a diagram illustrating another example of the coupling structure of a battery protective circuit of a battery assembly, according to an example embodiment of the present disclosure.

FIG. 14 is a diagram illustrating another example of the coupling structure of a battery assembly, according to an example embodiment of the present disclosure.

Referring to FIG. 14, according to an example embodiment of the present disclosure, the bracket header 125 may be coupled to one side of the battery 110 to protect the battery 110. In addition, the bracket header 125 may have a protection structure which prevents and/or reduces a likelihood of the liquid leaking from the battery 110 from making contact with the human body of the user when the liquid leaks from the battery 110 as the battery 110 is broken. In detail, the battery structure may have a step structure which prevents and/or reduces the likelihood of the leaking liquid from flowing toward a skin of the human body wearing the electronic device 10, even if the liquid leaks from one side of the battery 110. To this end, the bracket header 125 of the battery structure may include a first substrate part 1410 and a second substrate part 1420 in state 1401. The first substrate part 1410 may have an area wider than an area of the second substrate part 1420. Accordingly, on the first substrate part 1410, the second substrate 1420 and an end portion of the battery 110 may be placed. As described with reference to FIG. 13, the battery 110 may have a structure in which at least one pressure reduction inducing part is formed at one end portion of the battery 110.

Accordingly, as gas is generated inside the battery 110, the internal pressure is increased. In this case, the liquid may leak through an area of the battery 110 having the pressure reduction inducing part. The leaking liquid first makes contact with the first substrate part 1410 and the second substrate part 1420. Accordingly, the electronic device 10 may prevent and/or reduce the likelihood of the leaking liquid from making contact with the skin under the first substrate part 1410.

According to various embodiments, as illustrated in state 1403, in the case that the bracket header 125 includes the first substrate part 1410 and the second substrate part 1420, the battery 110 may include a body part 110a and a protrusion part 110b protruding from one side of the body part 110a. The protrusion part 110b may include at least one pressure reduction inducing part. The protrusion part 110b may be disposed to face an upper end portion of the first substrate part 1410 and a side portion of the second substrate part 1420. The body part 110a may face a side portion of the first substrate part 1410. Accordingly, even if liquid leaks from the end portion of the protrusion part 110b, the leaking liquid stays between the first substrate part 1410 and the second substrate part 1420. Accordingly, the leaking liquid may not make contact with the skin of the user.

Figure 15:
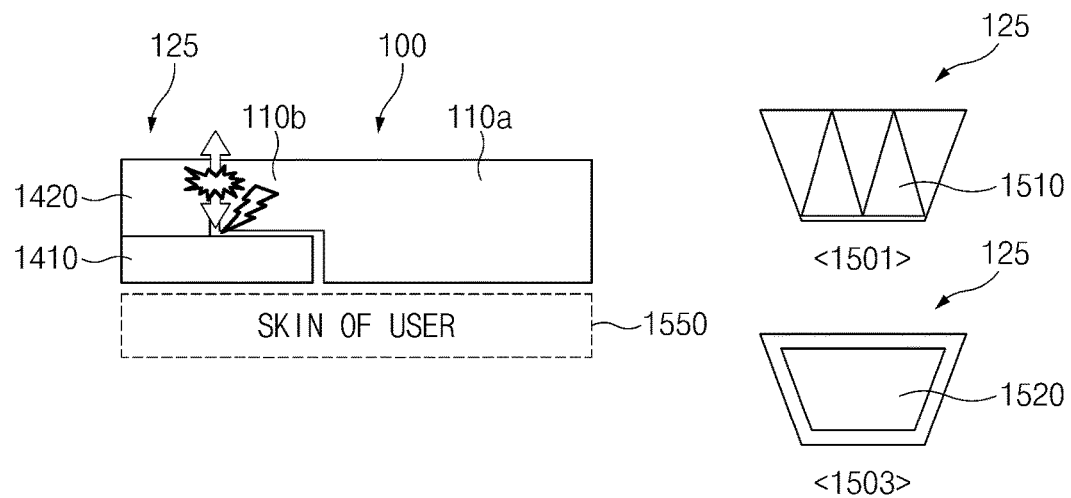
FIG. 15 is a diagram illustrating another example of the coupling structure of a battery assembly, according to an example embodiment of the present disclosure.

FIG. 15 is a diagram illustrating another example of the coupling structure of the battery assembly, according to an example embodiment of the present disclosure.

Referring to FIG. 15, according to an example embodiment of the present disclosure, in the battery structure for protecting from the leaking liquid, the bracket header 125 may include the first substrate part 1410 and the second substrate part 1420. The battery 110 may include the body part 110*a* and the protrusion part 110*b*. The protrusion part 110*b* may be disposed to face at least a portion of a top surface of the first substrate part 1410 and the side portion of the second substrate part 1420.

According to an example embodiment, at least one of the first substrate part 1410 and the second substrate part 1420 may include a guide recess 1510 as illustrated in state 1501. For example, the guide recess 1510 has a width which is wider in a portion connected with the battery 110. The width of the guide recess 1510 is gradually narrowed as the width is further away from the portion connected with the battery 110. At least one guide recess 1510 may be disposed, for example, in a triangular shape. The guide recess 1510 may be provided in the top surface of the first substrate part 1410 or provided by recessing the side portion of the second substrate part 1420 to guide the liquid leaking from the end portion of the protrusion part 110*b* and to isolate the liquid.

According to various example embodiments, at least one of the first substrate part 410 and the second substrate part 1420 may include a storage recess 1520 as illustrated in state 1503. The storage recess 1520 may include a specific cavity (empty space) provided inside the bracket header 125. For example, the storage recess 1520 may be provided by engraving the top surface of the first substrate part 1410. When liquid leaks from the protrusion part 110*b*, the liquid may be isolated in the storage recess 1520. Accordingly, the liquid leaking from the battery 110 does not directly make contact with a skin 1550 of a user, but may be stored in a safety place.

The electronic device 10 may detect the leakage of liquid from the battery 110, and may output a notification of the leakage of liquid through the display 15 seated on the body 11. In addition, the electronic device 10 may output a specific sound or a notification related to the leakage of the liquid through a speaker. To this end, the processor 17 of the electronic device 10 may detect a basic power intensity of the battery 110 at a specific period of time or in every use of the battery 110. If the detected power intensity corresponds to a power intensity resulting from the leakage of the liquid, the notification of the leakage of the liquid may be output.

According to various example embodiments, the strap according to an example embodiment of the present disclosure may include a battery having a specific width, a specific thickness, and a specific length, a battery bracket having a size approximate to or greater than the size of the battery, seating the battery, and having a part curved with a specific curvature, and a strap cover surrounding the battery bracket on which the battery is seated. The battery includes contents related to the charging or the discharging of power and a case which surrounds the contents. In this case, a pressure reduction inducing part may be formed in at least one portion of an edge of the case and may induce gas leakage as the internal pressure of the battery is increased. The pressure reduction inducing part may be formed on an edge connected with the protection circuit of the battery. The bracket header 125 may include a recess for storing the liquid leaking through the pressure reduction inducing part.

According to various example embodiments, an electronic device according to an embodiment of the present disclosure may include a strap including a battery having a pressure reduction inducing part, a battery bracket, and a scrap cover, and a body engaged with at least one strap.

Figure 16:
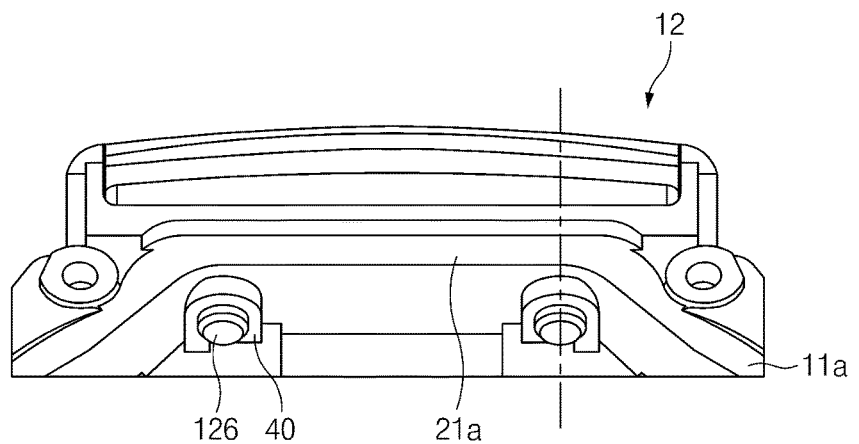
FIG. 16 is a diagram illustrating an example of the coupling structure of a strap and a body, according to an example embodiment of the present disclosure.
Figure 16:
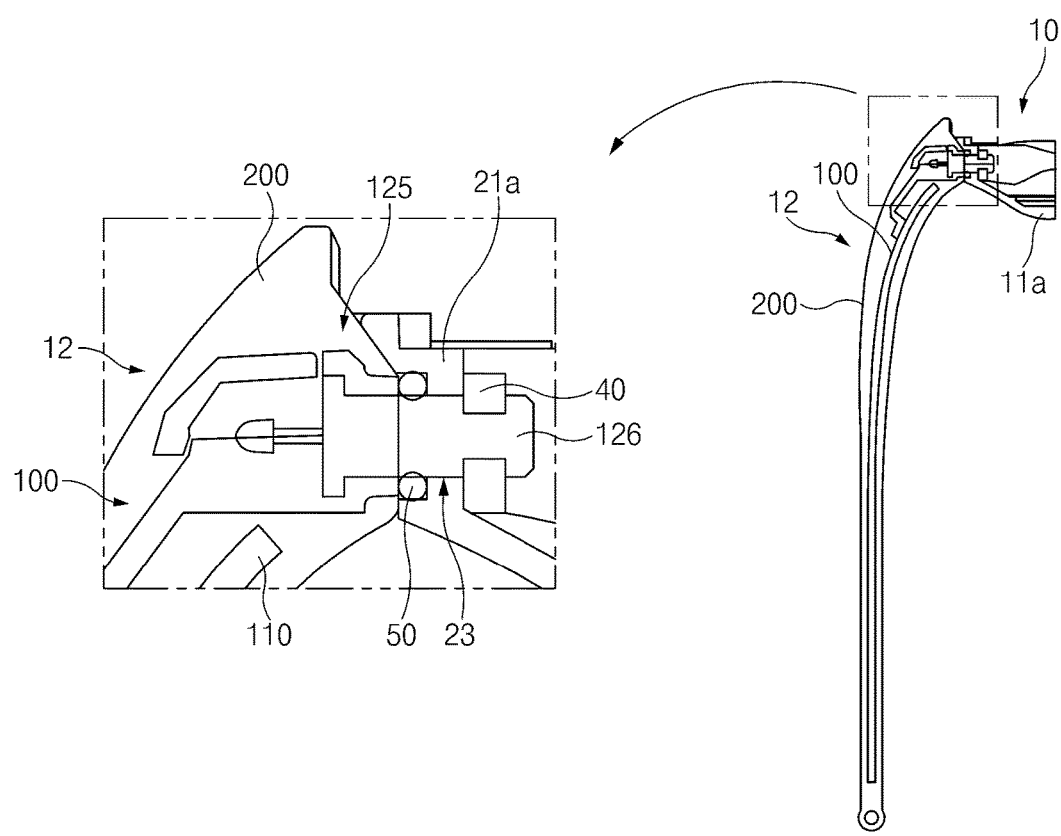

FIG. 16 is a diagram illustrating an example of the coupling structure of a strap and a body, according to an example embodiment of the present disclosure.

Referring to FIG. 16, as described above, the strap 12 is coupled to one side of the lower housing 11*a* of the body 11. The strap 12 may include the strap cover 200 and the battery assembly 100.

The lower housing 11*a* of the body 11 may include the terminal hole 23 into which the electrode rod 126 disposed at one side of the battery assembly 100 is able to be inserted. The stopper 40 may be coupled to the engraved ring formed in one side of the electrode rod 126 if the electrode rode 126 is inserted into the terminal hole 23. Accordingly, the stopper 40 may support the electrode rod 126, thereby preventing and/or reducing the likelihood of the electrode rod 126 from deviating from the terminal hole 23 in a direction opposite to the direction that the electrode rod 126 is inserted into the terminal hole 23. The stopper 40 may be disposed on each electrode rod 126 inserted into the terminal hole 23.

In addition, the water-proof member 50 may be disposed at one side of the electrode rode 126. The water-proof member 50 may be disposed at a lower end portion of the electrode 126 and may be disposed to make contact with an outer portion of the strap sidewall 21*a* disposed in the body 11. The diameter and the size of the water-proof member 50 may be greater than the diameter and the size of a peripheral portion of the terminal hole 23 and may be formed of an elastic material. Accordingly, the electrode rod 126 is pressed to the strap sidewall 21*a* and reduced in shape by pressure applied when the electrode rod 126 is inserted into the terminal hole 23. Thus, the electrode rod 126 may be interposed between the strap sidewall 21*a* and the bracket header 125. Elastic force is applied such that the shape of the water-proof member 50 is returned to an original shape due to an elastic property. Accordingly, the water-proof member 50 may be filled into the gap between the terminal hole 23 and the electrode rod 126. A portion of the electrode rod disposed at the strap 12 may be electrically connected with wires of the battery 110 disposed on the bracket header 125. According to various embodiments, silicone may be dispensed and coated on a peripheral portion of the terminal hole 23 in substitution for the water-proof member 50, after the electrode rod 126 is inserted into the terminal hole 23 in the strap sidewall.

In the battery bracket 120 serving as the central axis of the battery assembly 100, at least one furrow is provided in an upper end portion coupled to the body 11 to form a specific curved part. Accordingly, although a portion of the strap 12 (e.g., a lower end portion of the strap 12) is provided to be movable at a specific angle or more, the degree of the freedom in the strap 12 may be gradually reduced toward a coupling portion of the strap 12 to the body 11.

Figure 17:
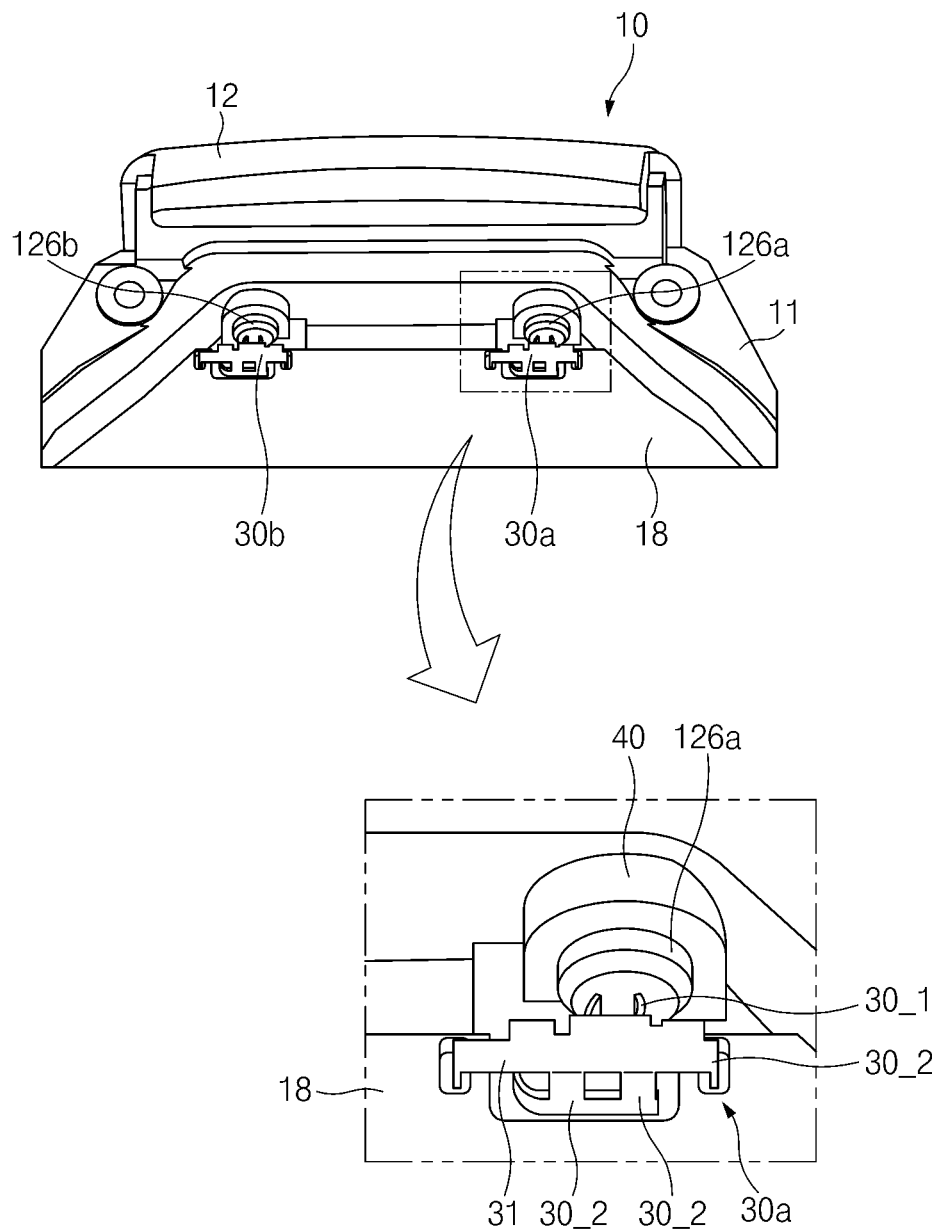
FIG. 17 is a diagram illustrating an example electrical connection structure between an electrode rod and a body, according an example embodiment of the present disclosure.

FIG. 17 is a diagram illustrating an example electrical connection structure between an electrode rod and a body, according an example embodiment of the present disclosure.

Referring to FIG. 17, as described above, the electronic device 10 may include at least one component, such as the printed circuit board 18, inside the body 11 (e.g., a lower housing). Components such as the processor 17 and the memory 16 may be mounted on the printed circuit board 18. The strap 12 may be coupled to one side of the body 11.

According to an embodiment, clips 30*a* and 30*b*, which are electrically connected with the electrode rods 126*a* and 126*b*, may be provided at one side of the printed circuit board 18. For example, the print circuit board 18 may include the first clip 30*a* which is able to be electrically connected with the first electrode rod 126*a* and the second clip 30*b* which is able to be electrically connected with the second electrode rod 126*b*. The first clip 30*a* and the second clip 30*b* may be electrically connected with the main power supply unit disposed in the body 11 through a wiring disposed on the printed circuit board 18. The first clip 30*a* and the second clip 30*b* may directly supply power to the display 15 under the control of the processor 17.

For example, the first clip 30*a* may be mounted on the printed circuit board 18 in a specific direction (e.g., in the up-down direction), and may be electrically connected with the electrode rod 126*a* which is disposed in a horizontal direction through the terminal hole of the strap sidewall 21*a*. To this end, the first clip 30*a*, which includes a body part 31 and a blade part 30_1 provided at one side of the body part 31 and making contact with the first electrode rod 126*a*, may be mounted on the printed circuit board 18. The first clip 30*a* may include at least one of pillars 30_2 which elastically support the first electrode 126*a* when the blade part 30_1 makes contact with the first electrode rod 126*a*. The blade part 30_1 and the pillars 30_2 may be disposed to be inclined at a specific angle in a specific direction from edges of the body part 31. The second clip 30*b* may be provided in the same shape as the shape of the first clip 30*a*. The shapes and the positions of the first clip 30*a* and the second clip 30*b*, which are described above, may be varied depending on design change.

Figure 18A:
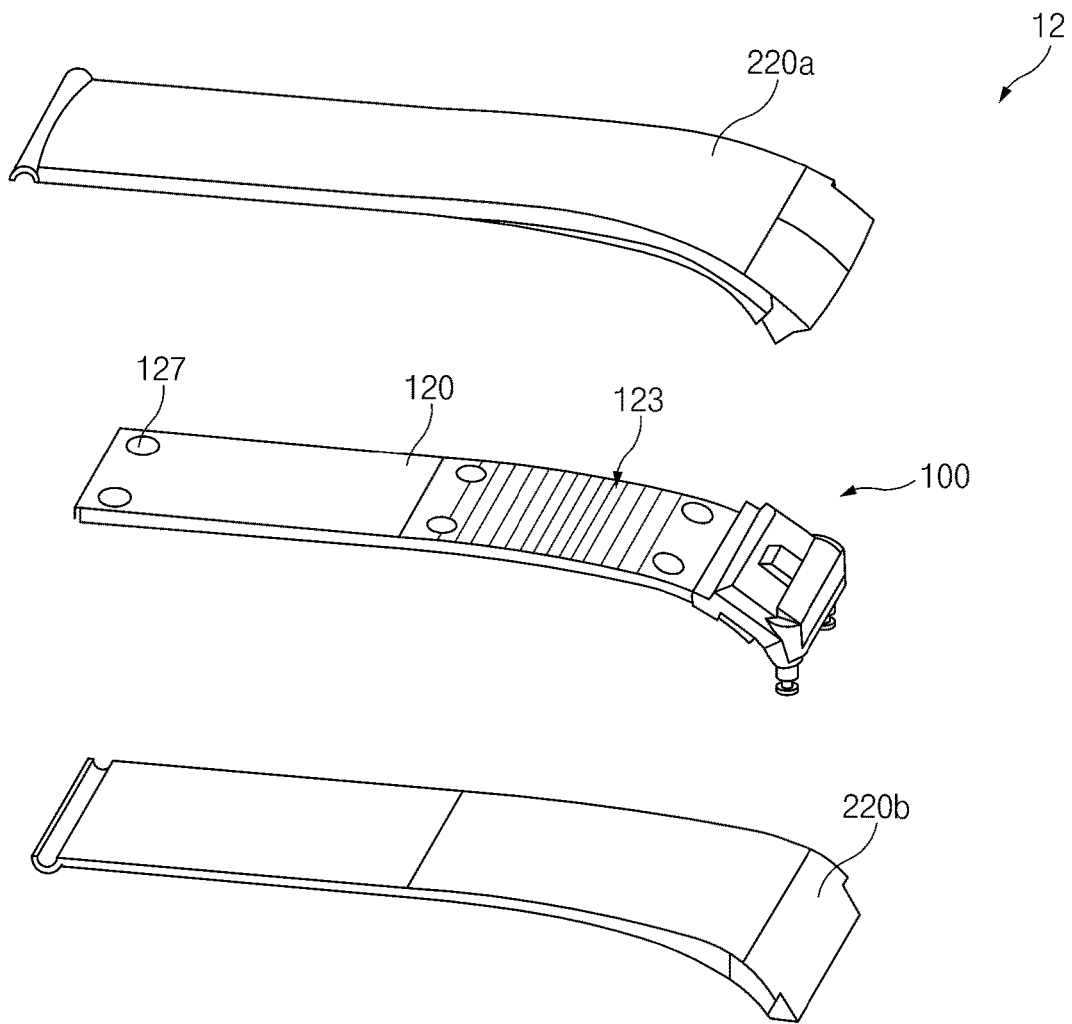
FIG. 18A is a diagram illustrating another example of a strap structure, according to an example embodiment of the present disclosure.

FIG. 18A is a diagram illustrating another example of a strap structure, according to an example embodiment of the present disclosure.

Referring to FIG. 18A, the structure of the strap 12 may include the upper strap cover 220*a* and the lower strap cover 220*b* as described above. At least a portion of the upper strap cover 220*a* and the lower strap cover 220*b* may be formed of a material such as leather. The upper strap cover 220*a* is combined with the lower strap cover 220*b* to surround the battery assembly 100. The width, the thickness, and the area of one side of the upper strap cover 220*a* (e.g., a portion of the upper strap cover 220 coupled to the body 11) may be greater than the width, the thickness, and the area of an opposite side of the upper strap cover 220*a* (e.g., a portion of the upper strap cover 220 coupled to another strap). One side and an opposite side of the lower strap cover 220*b* may be formed corresponding to those of the upper strap cover 220*a*. In one side of the lower strap cover 220*b*, a hole or a recess may be formed in a position in which the electrode rod is to be disposed, such that at least a portion of the electrode rod is exposed to the outside.

According to an embodiment, at least one furrow 123 may be disposed in one side (e.g., a curved part) of the battery bracket 120 of the battery assembly 100. Accordingly, at least a portion of an upper end portion of the battery assembly 100 may have a specific curvature corresponding to the curved state of the battery bracket 120 such that the battery assembly 100 overall has a curved shape.

According to an embodiment, the case of the battery 110 disposed in the battery assembly 100 may be provided without the above-described specific pattern (e.g., a flat pattern or a plain pattern having no additional pattern). Accordingly, the case of the battery 110 may include only a single polymer layer without including an additional rigid layer. In addition, although the battery bracket 120 includes the fixing hole 127, the fixing hole 127 may be omitted depending on design change. In the case that the fixing hole 127 is omitted, the support body of the battery bracket 120 may be provided in a flat structure in which a hole or a recess is not formed in the substrate.

When the strap 12 is formed of a leather material, spot facing may be performed such that the battery assembly 100 is seated between the upper strap cover 220*a* and the lower strap cover 220*b*, and then the seating part subject to the spot facing may be coated with bonding liquid. Thereafter, the battery assembly 100 may be seated on the upper strap cover 220*a* and may be covered with the lower strap cover 220*b*, and bonding coupling may be performed, thereby forming the strap 12.

Figure 18B:
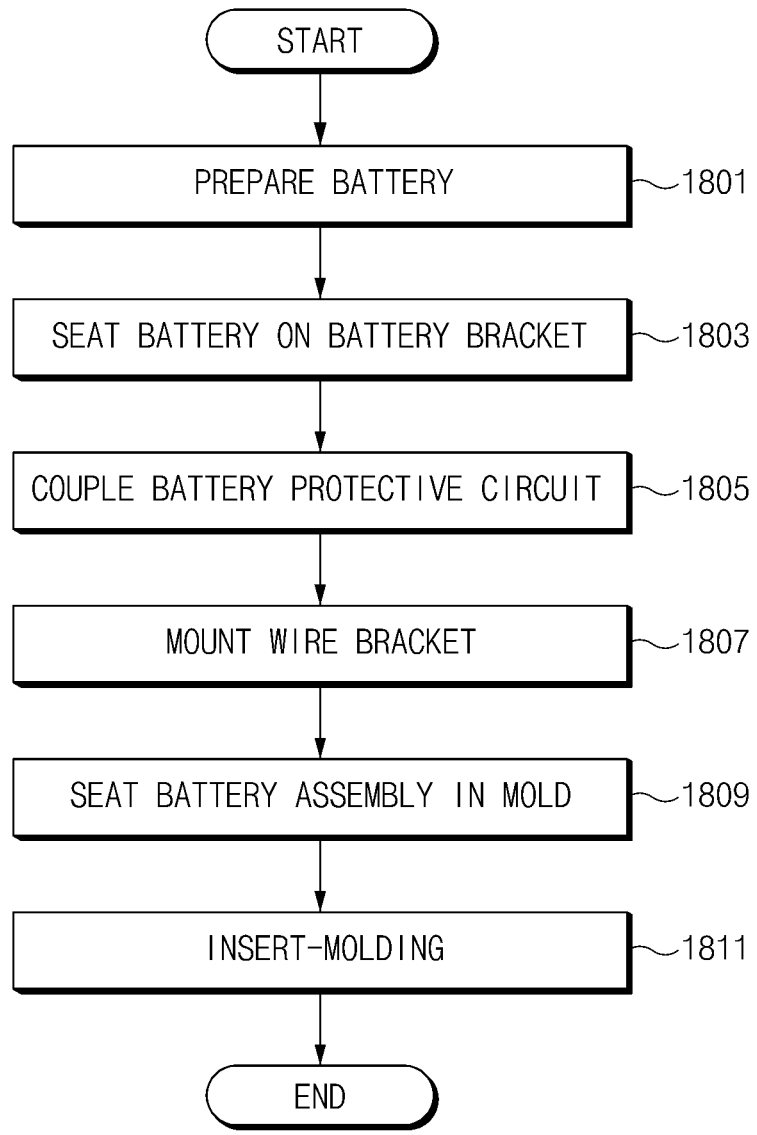
FIG. 18B is a flowchart illustrating an example of a method of forming a strap, according to an example embodiment of the present disclosure.

FIG. 18B is a flowchart illustrating an example method of forming a strap, according to an example embodiment of the present disclosure.

The battery 110 may be prepared in operation 1801. The battery 110 may include a secondary battery. At least portion of the battery 110 may be formed of a flexible material. At least a portion of the surface of the battery 110 may have a zig-zag pattern formed in a lengthwise direction or in a widthwise direction (or in the transverse direction or the longitudinal direction). According to an embodiment, as the battery 110 is seated on the battery bracket 120, the zig-zag pattern may be formed on the surface of the battery 110, which is exposed to the outside.

In operation 1803, the battery 110 may be seated on the battery bracket 120. To this end, as at least a portion of the battery bracket 120 has a furrow, the battery bracket 120 may be maintained in a specific curved state. At least one guard (e.g., the guard 128 or 129) provided on the battery bracket 120 may prevent and/or reduce the likelihood of the battery 110 from moving in the left-right direction or the up-down direction.

In operation 1805, the battery protective circuit 140 may be connected (coupled) to the battery 110. The battery protective circuit 140 may be electrically connected with the battery 110 and may include at least one wire. The wire may be disposed in the direction of the bracket header 125 of the battery bracket 120. The bracket header 125 may include at least one recess in which the wire is disposed.

In operation 1807, the wire bracket 160 may be mounted. The wire bracket 160 may be disposed to cover the wire seated in the bracket header 125. The wire bracket 160 may prevent and/or reduce the likelihood of the wire from being disconnected. As the wire bracket 160 is mounted, the battery assembly 100 may be provided.

In operation 1809, the battery assembly 100 may be seated in a mold. The mold may be disposed corresponding to the outer appearance of the strap 12. The mold may include protrusions coupled to at least one recess or hole provided in the battery bracket 120.

In operation 1811, insert-molding may be performed. Resin or an insert-molding filling material may be injected into the mold in which the battery assembly 100 is seated. The insert-molding filling material may be uniformly injected into the entire portion of the mold including the edge of the mold while the filling material is moving in the zig-zag pattern formed on the surface of the battery 110. The strap 12 provided in the above manner is coupled to the body 11 to serve as a power supply which supplies power to the electronic device. In addition, the strap 12 may provide a wearing function for a user.

According to various example embodiments, the strap 12 may be manufactured through various processes depending on materials of the outer appearance of the strap 12. For example, in the case that the strap 12 including the wireless charging unit 130 is formed of silicone or a rubber material, the wireless charging unit 130 may be seated on the battery bracket 120. The battery 110, which has a flexible property, may be seated on the battery bracket 120. The battery bracket 120 may include a furrow line for preventing and/or reducing a likelihood of a spring back phenomenon so as to maintain the shape of a designed product. The bottom part of the battery bracket 120 may include a fixing hole. To this end, a process of providing the furrow and the fixing hole of the battery bracket 120 may be performed. In addition, the battery bracket 120 may include a first battery guard and a second battery guard formed at left and right side portions of the battery bracket 120. A hamming structure (e.g., bending of an upper end portion) may be applied to the first battery guard to prevent and/or reduce the likelihood of the battery 110 from being nicked. Next, the battery protective circuit may be disposed on an upper end portion of the battery 110, and wires coming from the battery protective circuit may be electrically connected (soldered) with the electrode rod. Thereafter, the wire bracket for the protection of the wire is assembled with the bracket header 125 to prevent the wire from being disconnected due to the pressure of the insert-molding when the strap is formed.

The battery assembly 100 may be seated in the mold having a specific shape. In this case, the battery assembly 100 may be seated in the mold on the basis of the fixing hole 127. The case 114 (or an external packaging material) of the flexible battery 110 may have an inclined embossment shape which is advantageous to resin flow.

According to various example embodiments, a strap is provided. The strap may include a battery including a case, wherein a plurality of zig-zag patterns are formed on at least a portion of a surface of the case, have hills and valleys, and are disposed in a specific direction, a battery bracket formed in a size approximate to or greater than a size of the battery, wherein the battery is seated on the battery bracket such that the zig-zag patterns of the battery are disposed on an outer portion of the battery and a strap cover surrounding the battery bracket on which the battery is seated, wherein the battery bracket includes at least one furrow.

According to an example embodiment, the battery bracket may include a plurality of furrows disposed around a curved part.

According to an example embodiment, a distance between furrows formed in an area of the curved part, which has a higher curvature, may be shorter than a distance between furrows formed in an area of the curved part, which has a lower curvature.

According to an example embodiment, a depth of a furrow formed in an area of a curved part of the battery bracket, which has a higher curvature, is deeper than a depth of a furrow formed in an area of the curved part, which has a lower curvature.

According to an example embodiment, the battery bracket may include a support body including a curved part and a bracket header coupled to one side of the support body.

According to an example embodiment, the battery bracket may further include at least one of a first guard, which extends from opposite edges of the support body while the first guard is inclined at a specific angle, to guard the battery and a second guard formed at an end portion of one side of the support body to prevent the battery from being separated from the battery bracket.

According to an example embodiment, an upper end portion of the at least one of the first guard and the second guard may be rounded or bent.

According to an example embodiment, the battery bracket may further include at least one fixing hole formed through front and rear surfaces of the support body.

According to an example embodiment, the bracket header may further include at least one electrode rod electrically connected with wires connected with electrode terminals of the battery.

According to an example embodiment, the battery bracket may further include a wire bracket disposed to cover the wires disposed in the bracket heater.

According to an example embodiment, the strap may further include a wireless charging unit seated on one side of the battery bracket and electrically connected with the battery.

According to an example embodiment, the battery may further include at least one pair of a negative electrode plate and a positive electrode plate spaced apart from each other by a specific distance and an electrolyte disposed around the negative electrode plate and the positive electrode plate, and the case may surround the negative electrode plate, the positive electrode plate, and the electrolyte.

According to an example embodiment, the case may include a first polymer layer surrounding the negative electrode plate, the positive electrode plate, and the electrolyte, a rigid layer disposed on the first polymer layer and a second polymer layer surrounding the rigid layer.

According to an example embodiment, the case may have a specific pattern formed in at least a portion of the rigid layer and having at least one inflection point.

According to an example embodiment, the specific pattern may include a first sub-pattern repeating in a first direction and a second sub-pattern repeating in a second direction different from the first direction.

According to an example embodiment, the specific pattern may further include a passage formed as the first sub-pattern is spaced apart from the second sub-pattern.

According to an example embodiment, the case may include at least one pressure reduction inducing part configured to induce leakage of a liquid when internal pressure of the battery is increased.

According to an example embodiment, the battery bracket may include a bracket header coupled to the battery, and the bracket header may include at least one recess configured to receive the liquid leaking through the pressure reduction inducing part.

According to various example embodiments, a wearable electronic device may be provided. The wearable may include a body housing including a first surface, a second surface facing a direction opposite to a direction of the first surface, and a side surface surrounding a space formed between the first surface and the second surface, a display included inside the body housing and exposed through the first surface, a processor included inside the body housing and electrically connected with the display, a wireless communication circuit included inside the body housing, a power management circuit included inside the body housing and electrically connected with the display, the processor, and the wireless communication circuit and a wearing member coupled to a portion of the body housing, extending in a first direction to be detachably mounted on a portion of a human body of a user, and being bendable in the first direction, wherein the wearing member may include an electronic component extending in the first direction and including an external surface that includes a repeating pattern including recesses and/or protrusions formed in at least one direction that is different from the first direction and a polymer surrounding the external surface of the electronic component and forming an external surface of the wearing member.

According to an example embodiment, the electronic component may include a battery electrically connected with the power management circuit, wherein the wearing member may be detachably mounted in the body housing, wherein the wearing member may include a first electrical contact electrically connected with the battery, and wherein the portion of the body housing may be electrically connectable with the first electrical contact and includes a second electrical contact electrically connected with the power management circuit.

As described above, according to the present disclosure, in the strap 12 and the electronic device (e.g., a wearable electronic device) including the same, the battery may be mounted in a space separated from the inner part of the electronic device, such that power capacity is ensured and the battery is prevented and/or not substantially affecting the thickness of the body of the electronic device. In addition, the battery is removed from the body of the electronic device, and thus the thickness of the body may be reduced.

According to various example embodiments, the electronic device according to an embodiment of the present disclosure may include a strap including a battery having a specific width, a specific thickness, and a specific length, a battery bracket having a size approximate to or greater than the size of the battery, seating the battery, having at least one furrow formed around a part curved with a specific curvature, and a strap cover surrounding the battery bracket on which the battery is seated, and a body having a side portion coupled to the at least one strap.

According to various example embodiments, the body may further include at least one of a terminal hole, into which the electrode rod disposed on the strap is inserted, a stopper which prevents and/or reduces the likelihood of the electrode rod from deviating from the terminal hole, a clip electrically connected with the electrode rod and disposed on a printed circuit board, and a water-proof member interposed between the electrode rod and an outer wall of the body.

As described above, according to various example embodiments, the battery may be disposed in the strap to ensure the supply of additional power. The operation of wearing the power supply device may be easily performed, and the wearability may be improved. In addition, according to various embodiments, in the process of manufacturing the strap body, the failure of the strap body may be minimized and/or reduced and the damage resulting from the broken battery may be prevented and/or a likelihood thereof reduced.

Figure 19:
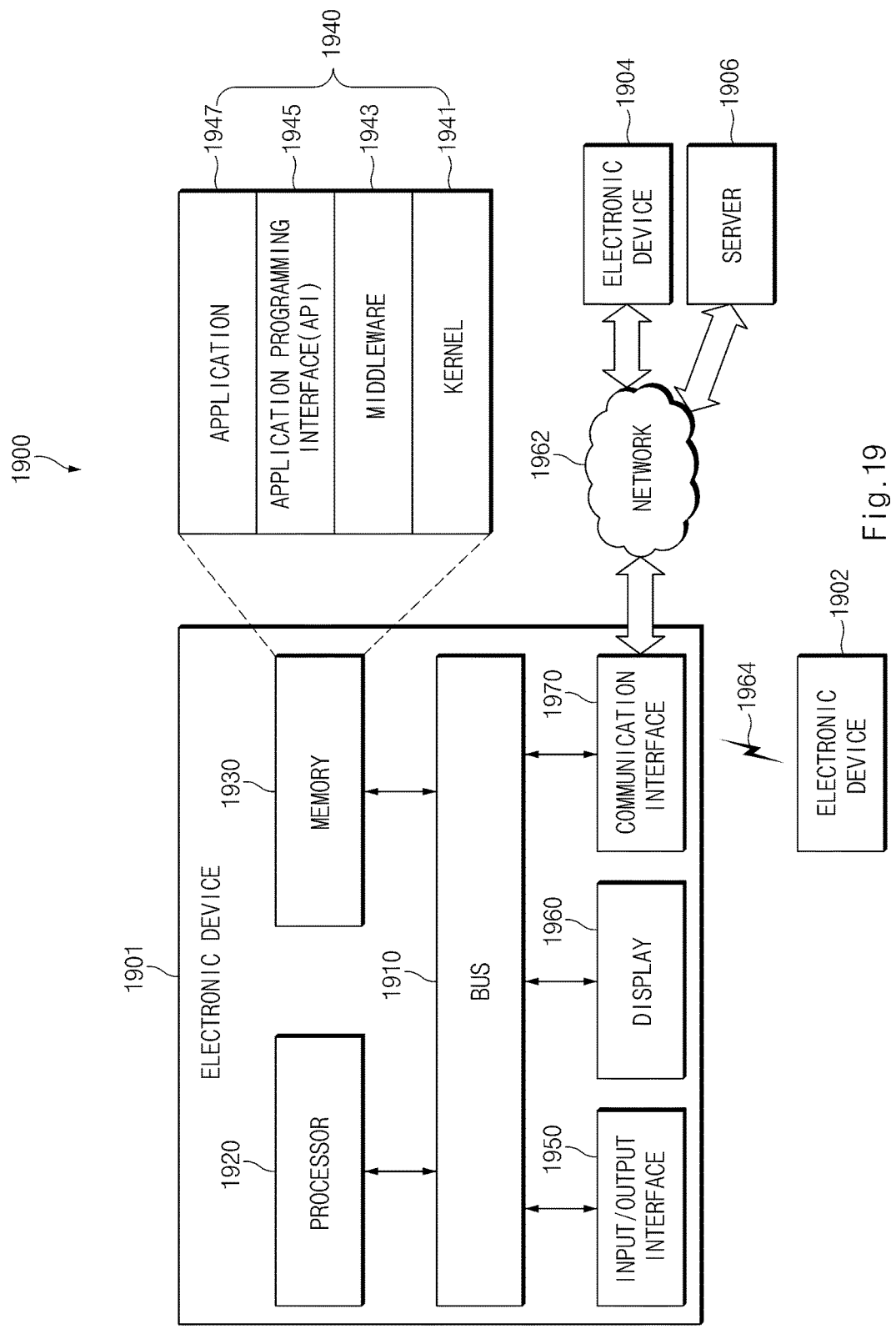
FIG. 19 is a diagram illustrating an example electronic device in a network environment, according to various example embodiments of the present disclosure.

FIG. 19 is a block diagram illustrating an example configuration of an example electronic device in a network environment 1900 according to an example embodiment of the present disclosure.

Referring to FIG. 19, in various embodiments, an electronic device 1901 and a first external electronic device 1902, a second external electronic device 1904, or a server 1906 may connect with each other through a network 1962 or local-area (e.g., short-range) communication 1964. The electronic device 1901 may include a bus 1910, a processor (e.g., including processing circuitry) 1920, a memory 1930, an input/output interface (e.g., including interface circuitry) 1950, a display 1960, and a communication interface (e.g., including communication circuitry) 1970. In various embodiments, at least one of the components may be omitted from the electronic device 1901, or other components may be additionally included in the electronic device 1901.

The bus 1910 may be, for example, a circuit which connects the components 1920 to 1970 with each other and transmits a communication signal (e.g., a control message and/or data) between the components.

The processor 1920 may include various processing circuitry, such as, for example, and without limitation, one or more of a dedicated processor, a central processing unit (CPU), an application processor (AP), or a communication processor (CP). For example, the processor 1920 may perform calculation or data processing about control and/or communication of at least another of the components of the electronic device 1901.

The memory 1930 may include a volatile and/or nonvolatile memory. The memory 1930 may store, for example, a command or data associated with at least another of the components of the electronic device 1901. According to an embodiment, the memory 1930 may store software and/or a program 1940. The program 1940 may include, for example, a kernel 1941, a middleware 1943, an application programming interface (API) 1945, and/or an least one application program 1947 (or "at least one application"), and the like. At least part of the kernel 1941, the middleware 1943, or the API 1945 may be referred to as an operating system (OS).

The kernel 1941 may control or manage, for example, system resources (e.g., the bus 1910, the processor 1920, or the memory 1930, and the like) used to execute an operation or function implemented in the other programs (e.g., the middleware 1943, the API 1945, or the application program 1947). Also, as the middleware 1943, the API 1945, or the application program 1947 accesses a separate component of the electronic device 1901, the kernel 1941 may provide an interface which may control or manage system resources.

The middleware 1943 may play a role as, for example, a go-between such that the API 1945 or the application program 1947 communicates with the kernel 1941 to communicate data.

Also, the middleware 1943 may process one or more work requests, received from the application program 1947, in order of priority. For example, the middleware 1943 may assign priority which may use system resources (the bus 1910, the processor 1920, or the memory 1930, and the like) of the electronic device 1901 to at least one of the at least one application program 1947. For example, the middleware 1943 may perform scheduling or load balancing for the one or more work requests by processing the one or more work requests in order of the priority assigned to the at least one of the at least one application program 1947.

The API 1945 may be, for example, an interface in which the application program 1947 controls a function provided from the kernel 1941 or the middleware 1943. For example, the API 1945 may include at least one interface or function (e.g., a command) for file control, window control, image processing, or text control, and the like.

The input/output interface 1950 may include various interface circuitry and play a role as, for example, an interface which may transmit a command or data input from a user or another external device to another component (or other components) of the electronic device 1901. Also, input and output interface 1950 may output an instruction or data received from another component (or other components) of the electronic device 1901 to the user or the other external device.

The display 1960 may include, for example, a liquid crystal display (LCD), a light emitting diode (LED) display, an organic LED (OLED) display, a microelectromechanical systems (MEMS) display, or an electronic paper display, or the like, but is not limited thereto. The display 1960 may display, for example, a variety of content (e.g., text, images, videos, icons, or symbols, and the like) to the user. The display 1960 may include a touch screen, and may receive, for example, touch, gesture, proximity, or a hovering input using an electronic pen or part of a body of the user.

The communication interface 1970 may include various communication circuitry and establish communication between, for example, the electronic device 1901 and an external device (e.g., a first external electronic device 1902, a second external electronic device 1904, or a server 1906). For example, the communication interface 1970 may connect to a network 1962 through wireless communication or wired communication and may communicate with the external device (e.g., the second external electronic device 1904 or the server 1906).

The wireless communication may use, for example, at least one of long term evolution (LTE), LTE-advanced (LIE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1964. The local-area communication 1964 may include, for example, at least one of wireless-fidelity (Wi-Fi) communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 1901 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 1962 may include a telecommunications network, for example, at least one of a computer network (e.g., a local area network (LAN) or a wide area network (WAN)), the Internet, or a telephone network.

Each of the first and second external electronic devices 1902 and 1904 may be the same as or different device from the electronic device 1901. According to an embodiment, the server 1906 may include a group of one or more servers. According to various embodiments, all or some of operations executed in the electronic device 1901 may be executed in another electronic device or a plurality of electronic devices (e.g., the first external electronic device 1902, the second external electronic device 1904, or the server 1906). According to an embodiment, if the electronic device 1901 should perform any function or service automatically or according to a request, it may request another device (e.g., the first external electronic device 1902, the second external electronic device 1904, or the server 106) to perform at least part of the function or service, rather than executing the function or service for itself or in addition to the function or service. The other electronic device (e.g., the first external electronic device 1902, the second external electronic device 1904, or the server 1906) may execute the requested function or the added function and may transmit the executed result to the electronic device 1901. The electronic device 1901 may process the received result without change or additionally and may provide the requested function or service. For this purpose, for example, cloud computing technologies, distributed computing technologies, or client-server computing technologies may be used.

Figure 20:
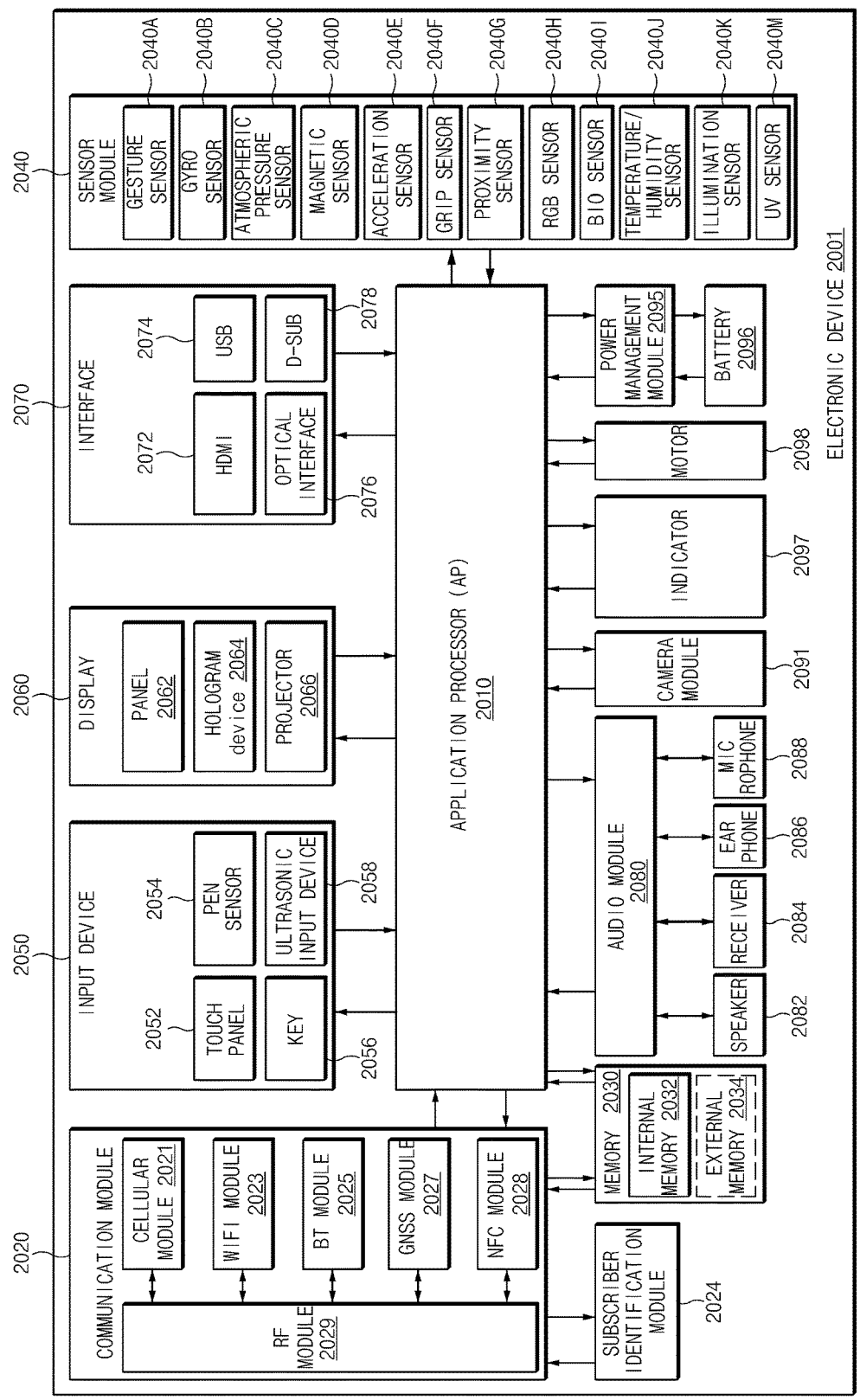
FIG. 20 is a block diagram illustrating an example electronic device, according to various example embodiments of the present disclosure.

FIG. 20 is a block diagram illustrating an example configuration of an example electronic device according to various example embodiments of the present disclosure.

Referring to FIG. 20, the electronic device 2001 may include, for example, all or part of an electronic device 1901 illustrated in FIG. 19. The electronic device 2001 may include one or more processors (e.g., including processing circuitry) 2010 (e.g., application processors (APs)), a communication module (e.g., including communication circuitry) 2020, a subscriber identification module (SIM) 2029, a memory 2030, a sensor module 2040, an input device (e.g., including input circuitry) 2050, a display 2060, an interface (e.g., including interface circuitry) 2070, an audio module 2080, a camera module 2091, a power management module 2095, a battery 2096, an indicator 2097, and a motor 2098.

The processor 2010 may include various processing circuitry and drive, for example, an operating system (OS) or an application program to control a plurality of hardware or software components connected thereto and may process and compute a variety of data. The processor 2010 may be implemented with, for example, a system on chip (SoC). According to an embodiment, the processor 2010 may include a graphic processing unit (GPU) (not shown) and/or an image signal processor (not shown). The processor 2010 may include at least some (e.g., a cellular module 2021) of the components shown in FIG. 20. The processor 2010 may load a command or data received from at least one of other components (e.g., a non-volatile memory) into a volatile memory to process the data and may store various data in a non-volatile memory.

The communication module 2020 may have the same or similar configuration to a communication interface 1970 of FIG. 19. The communication module 2020 may include various communication circuitry, such as, for example, and without limitation, the cellular module 2021, a wireless-fidelity (Wi-Fi) module 2023, a Bluetooth (BT) module 2025, a global navigation satellite system (GNSS) module 2027 (e.g., a GPS module, a Glonass module, a Beidou module, or a Galileo module), a near field communication (NFC) module 2028, and a radio frequency (RF) module 2029.

The cellular module 2021 may provide, for example, a voice call service, a video call service, a text message service, or an Internet service, and the like through a communication network. According to an embodiment, the cellular module 2021 may identify and authenticate the electronic device 2001 in a communication network using the SIM 2029 (e.g., a SIM card). According to an embodiment, the cellular module 2021 may perform at least part of functions which may be provided by the processor 2010. According to an embodiment, the cellular module 2021 may include a communication processor (CP).

The Wi-Fi module 2023, the BT module 2025, the GNSS module 2027, or the NFC module 2028, may include, for example, a processor for processing data transmitted and received through the corresponding module. According to various embodiments, at least some (e.g., two or more) of the cellular module 2021, the Wi-Fi module 2023, the BT module 2025, the GNSS module 2027, or the NFC module 2028, may be included in one integrated chip (IC) or one IC package.

The RF module 2029 may transmit and receive, for example, a communication signal (e.g., an RF signal). Though not shown, the RF module 2029 may include, for example, a transceiver, a power amplifier module (PAM), a frequency filter, or a low noise amplifier (LNA), or an antenna, and the like. According to another embodiment, at least one of the cellular module 2021, the Wi-Fi module 2023, the BT module 2025, the GNSS module 2027, or the NFC module 2028 may transmit and receive an RF signal through a separate RF module.

The SIM 2024 may include, for example, a card which includes a SIM and/or an embedded SIM. The SIM 2024 may include unique identification information (e.g., an integrated circuit card identifier (ICCID)) or subscriber information (e.g., an international mobile subscriber identity (IMSI)).

The memory 2030 (e.g., a memory 1930 of FIG. 19) may include, for example, an embedded memory 2032 and/or an external memory 2034. The embedded memory 2032 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 2034 may include a flash drive, for example, a compact flash (CF), a secure digital (SD), a micro-SD, a mini-SD, an extreme digital (xD), a multimedia car (MMC), or a memory stick, and the like. The external memory 2034 may operatively and/or physically connect with the electronic device 2001 through various interfaces.

The sensor module 2040 may measure, for example, a physical quantity or may detect an operation state of the electronic device 2001, and may convert the measured or detected information to an electrical signal. The sensor module 2040 may include at least one of, for example, a gesture sensor 2040A, a gyro sensor 2040B, a barometer (e.g., atmospheric pressure) sensor 2040C, a magnetic sensor 2040D, an acceleration sensor 2040E, a grip sensor 2040F, a proximity sensor 2040G, a color sensor 2040H (e.g., red, green, blue (RGB) sensor), a biometric (e.g., bio) sensor 2040I, a temperature/humidity sensor 2040J, an illumination sensor 2040K, or an ultraviolet (UV) sensor 2040M. Additionally or alternatively, the sensor module 2040 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 2040 may further include a control circuit for controlling at least one or more sensors included therein. According to various embodiments, the electronic device 2001 may further include a processor configured to control the sensor module 2040, as part of the processor 2010 or to be independent of the processor 2010. While the processor 2010 is in a sleep state, the electronic device 2001 may control the sensor module 2040.

The input device 2050 may include various input circuitry, such as, for example, and without limitation, a touch panel 2052, a (digital) pen sensor 2054, a key 2056, or an ultrasonic input device 2058. The touch panel 2052 may use at least one of, for example, a capacitive type, a resistive type, an infrared type, or an ultrasonic type. Also, the touch panel 2052 may further include a control circuit. The touch panel 2052 may further include a tactile layer and may provide a tactile reaction to a user.

The (digital) pen sensor 2054 may be, for example, part of the touch panel 2052 or may include a separate sheet for recognition. The key 2056 may include, for example, a physical button, an optical key, or a keypad. The ultrasonic input device 2058 may allow the electronic device 2001 to detect a sound wave using a microphone (e.g., a microphone 2088) and to verify data through an input tool generating an ultrasonic signal.

The display 2060 (e.g., a display 1960 of FIG. 19) may include a panel 2062, a hologram device 2064, or a projector 2066. The panel 2062 may include the same or similar configuration to the display 160 or 1960. The panel 2062 may be implemented to be, for example, flexible, transparent, or wearable. The panel 2062 and the touch panel 2052 may be integrated into one module. The hologram device 2064 may show a stereoscopic image in a space using interference of light. The projector 2066 may project light onto a screen to display an image. The screen may be positioned, for example, inside or outside the electronic device 2001. According to an embodiment, the display 2060 may further include a control circuit for controlling the panel 2062, the hologram device 2064, or the projector 2066.

The interface 2070 may include various interface circuitry, such as, for example, and without limitation, a high-definition multimedia interface (HDMI) 2072, a universal serial bus (USB) 2074, an optical interface 2076, or a D-subminiature 2078. The interface 2070 may be included in, for example, a communication interface 170 or 1970 shown in FIG. 2 or 19. Additionally or alternatively, the interface 2070 may include, for example, a mobile high definition link (MHL) interface, an SD card/multimedia card (MMC) interface, or an infrared data association (IrDA) standard interface.

The audio module 2080 may convert a sound and an electric signal in dual directions. At least part of components of the audio module 2080 may be included in, for example, an input and output interface 1950 (or a user interface) shown in FIG. 19. The audio module 2080 may process sound information input or output through, for example, a speaker 2082, a receiver 2084, an earphone 2086, or the microphone 2088, and the like.

The camera module 2091 may be a device which captures a still image and a moving image. According to an embodiment, the camera module 2091 may include one or more image sensors (not shown) (e.g., a front sensor or a rear sensor), a lens (not shown), an image signal processor (ISP) (not shown), or a flash (not shown) (e.g., an LED or a xenon lamp).

The power management module 2095 may manage, for example, power of the electronic device 2001. According to an embodiment, though not shown, the power management module 2095 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 2096 and voltage, current, or temperature thereof while the battery 2096 is charged. The battery 2096 may include, for example, a rechargeable battery or a solar battery.

The indicator 2097 may display a specific state of the electronic device 2001 or part (e.g., the processor 2010) thereof, for example, a booting state, a message state, or a charging state, and the like. The motor 2098 may convert an electric signal into mechanical vibration and may generate vibration or a haptic effect, and the like. Though not shown, the electronic device 2001 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFlo™ standard, and the like. Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The terminology "module" used herein may refer, for example, to a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include, for example, and without limitation, at least one of a dedicated processor, a CPU, an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Various example of the present disclosure described and illustrated in the drawings are provided as examples to describe technical content and to aid in understanding, but do not limit the present disclosure. Accordingly, it should be understood that besides the various example embodiments illustrated and described herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

What is claimed is:
1. A strap comprising:
a battery including a case, wherein the case includes a plurality of zig-zag patterns formed on at least a portion of a surface of the case, the patterns having hills and valleys, and the patterns being disposed in a specific direction;

a battery bracket having a size approximately equal to or greater than a size of the battery, wherein the battery is seated on the battery bracket, wherein the zig-zag patterns are disposed on an outer portion of the battery; and a strap cover surrounding the battery bracket on which the battery is seated, wherein the battery bracket includes at least one furrow.

2. The strap of claim 1, wherein the battery bracket includes a plurality of furrows disposed along a curved part of the battery bracket.

3. The strap of claim 2, wherein a distance between furrows in an area of a curved part of the battery bracket having a higher curvature than a predetermined curvature, is shorter than a distance between furrows formed in an area of the curved part of the battery bracket having a lower curvature than the predetermined curvature.

4. The strap of claim 2, wherein a depth of a furrow in an area of a curved part of the battery bracket having a higher curvature than a predetermined curvature, is deeper than a depth of a furrow in an area of the curved part of the battery bracket having a lower curvature than the predetermined curvature.

5. The strap of claim 1, wherein the battery bracket includes:
a support body including a curved part; and
a bracket header coupled to one side of the support body.

6. The strap of claim 5, wherein the battery bracket further includes at least one of:
a first guard, extending from opposite edges of the support body and being inclined at a specific angle, to guard the battery; and
a second guard formed at an end portion of one side of the support body configured to secure the battery to the battery bracket.

7. The strap of claim 6, wherein an upper end portion of the at least one of the first guard and the second guard is rounded or bent.

8. The strap of claim 5, wherein the battery bracket further comprises:
at least one fixing hole extending through front and rear surfaces of the support body.

9. The strap of claim 5, wherein the bracket header further comprises:
at least one electrode rod electrically connected with wires connected to electrode terminals of the battery.

10. The strap of claim 9, wherein the battery bracket further comprises:
a wire bracket disposed to cover the wires disposed in the bracket header.

11. The strap of claim 1, further comprising:
a wireless charging unit comprising wireless charging circuitry is seated on one side of the battery bracket and electrically connected with the battery.

12. The strap of claim 1, wherein the battery further comprises:
at least one pair of electrode plates comprising a negative electrode plate and a positive electrode plate spaced apart from each other by a specific distance; and
an electrolyte disposed around the negative electrode plate and the positive electrode plate, and
wherein the case surrounds the negative electrode plate, the positive electrode plate, and the electrolyte.

13. The strap of claim 12, wherein the case comprises:
a first polymer layer surrounding the negative electrode plate, the positive electrode plate, and the electrolyte;
a rigid layer disposed over the first polymer layer; and
a second polymer layer surrounding the rigid layer.

14. The strap of claim 13, wherein the case includes a specific pattern in at least a portion of the rigid layer and having at least one inflection point.

15. The strap of claim 14, wherein the specific pattern includes:
a first sub-pattern repeating in a first direction; and
a second sub-pattern repeating in a second direction different from the first direction.

16. The strap of claim 15, wherein the specific pattern further includes:
a passage formed where the first sub-pattern is spaced apart from the second sub-pattern.

17. The strap of claim 12, wherein the case includes at least one pressure reduction inducing structure configured to induce leakage of a liquid when internal pressure of the battery is increased.

18. The strap of claim 17, wherein the battery bracket includes a bracket header coupled to the battery, and
wherein the bracket header includes at least one recess configured to receive liquid leaking through the pressure reduction inducing structure.

19. A wearable electronic device comprising:
a body housing including a first surface, a second surface facing a direction opposite a direction of the first surface, and a side surface surrounding a space formed between the first surface and the second surface;
a display included in the body housing and exposed through an opening in the first surface;
a processor disposed inside the body housing and electrically connected with the display;
a wireless communication circuit disposed inside the body housing;
a power management circuit disposed inside the body housing and electrically connected with the display, the processor, and the wireless communication circuit; and
a strap structure coupled to a portion of the body housing, extending in a first direction and configured to be detachably mounted on a portion of a body of a user, and configured to be bendable in the first direction,
wherein the strap structure includes:
an electronic component extending in the first direction and including an external surface that includes a repeating pattern of recesses and/or protrusions disposed in at least one direction different from the first direction; and
a polymer surrounding the external surface of the electronic component and defining an external surface of the strap structure.

20. The wearable electronic device of claim 19, wherein the electronic component includes a battery electrically connected with the power management circuit;
wherein the strap structure is configured to be detachably mounted in the body housing;
wherein the strap structure includes a first electrical contact configured to be electrically connected with the battery, and
wherein the portion of the body housing is configured to be electrically connectable with the first electrical contact and includes a second electrical contact configured to be electrically connected with the power management circuit.

* * * * *